US009800111B2

United States Patent
Palmer et al.

(10) Patent No.: US 9,800,111 B2
(45) Date of Patent: Oct. 24, 2017

(54) REGENERATIVE MOTOR AND COIL

(75) Inventors: Denis L. Palmer, Brigham City, UT (US); Robert A. Palmer, Jr., Fordland, MO (US); Damian Riddoch, Glenpool, OK (US); Edward Butler, Brigham City, UT (US); Charles Palmer, Port Orchard, WA (US)

(73) Assignee: Millennial Research Corporation, Bixby, OK (US)

( * ) Notice: Subject to any disclaimer, the term of this patent is extended or adjusted under 35 U.S.C. 154(b) by 0 days.

(21) Appl. No.: 13/601,543

(22) Filed: Aug. 31, 2012

(65) Prior Publication Data

US 2012/0326541 A1    Dec. 27, 2012

Related U.S. Application Data

(62) Division of application No. 12/542,412, filed on Aug. 17, 2009, now abandoned.

(60) Provisional application No. 61/188,994, filed on Aug. 15, 2008.

(51) Int. Cl.
| | |
|---|---|
| *H02K 3/04* | (2006.01) |
| *H02K 16/00* | (2006.01) |
| *H02K 21/24* | (2006.01) |
| *H02K 3/47* | (2006.01) |

(52) U.S. Cl.
CPC ............. *H02K 3/47* (2013.01); *H02K 3/04* (2013.01); *H02K 16/00* (2013.01); *H02K 21/24* (2013.01)

(58) Field of Classification Search
CPC .......... H02K 1/182; H02K 3/47; H02K 16/00; H02K 16/02; H02K 16/04; H02K 21/24; H02K 23/58; H02K 2201/15; H02K 2213/12; H02K 1/2793; H02K 3/04
USPC ...................... 310/67 R, 68 R, 83, 194, 208, 310/216.002–216.003, 254.1
See application file for complete search history.

(56) References Cited

U.S. PATENT DOCUMENTS

| | | |
|---|---|---|
| 3,441,761 A | 4/1969 | Painton et al. |
| 3,679,953 A | 7/1972 | Bedford |
| 4,211,963 A | 7/1980 | Muller |
| | (Continued) | |

FOREIGN PATENT DOCUMENTS

| | | |
|---|---|---|
| CN | 87206678 U | 6/1988 |
| CN | 1073306 A | 6/1993 |
| | (Continued) | |

OTHER PUBLICATIONS

Mogi, JP2002034214 Machine Translation, Jan. 2002.*
(Continued)

*Primary Examiner* — Quyen Leung
*Assistant Examiner* — Eric Johnson
(74) *Attorney, Agent, or Firm* — Fish & Richardson P.C.

(57) ABSTRACT

This invention presents a highly efficient electric motor which can be embodied in several configurations, including a standard motor, a hub motor, a linear motor, or other motor configuration. As a regenerative device, the motor may also act as a part-time or full-time electrical generator. There is provided a motor composed of a stator and a rotor. The stator has an array of coils arranged therein. The rotor has an array of magnets arranged therein. Each of the coils includes a first winding of wire wrapped around a core, and the wire has a non-circular cross-section. The wire can be a flattened wire.

23 Claims, 19 Drawing Sheets

(56) References Cited

U.S. PATENT DOCUMENTS

| | | | |
|---|---|---|---|
| 4,322,666 A | 3/1982 | Muller | |
| 4,340,833 A | 7/1982 | Sudo et al. | |
| 4,358,693 A | 11/1982 | Palmer et al. | |
| 4,427,907 A | 1/1984 | Flick et al. | |
| 4,634,958 A | 1/1987 | Cornwell | |
| 4,760,294 A | 7/1988 | Hansen | |
| 4,866,321 A | 9/1989 | Blanchard et al. | |
| 4,883,981 A | 11/1989 | Gerfast | |
| 5,184,040 A | 2/1993 | Lim | |
| 5,227,702 A | 7/1993 | Nahirney | |
| 5,514,923 A | 5/1996 | Gossler et al. | |
| 5,714,828 A | 2/1998 | Ackermann et al. | |
| 5,723,933 A * | 3/1998 | Grundl et al. | 310/266 |
| 5,744,895 A | 4/1998 | Seguchi et al. | |
| 5,744,896 A * | 4/1998 | Kessinger et al. | 310/268 |
| 5,783,894 A | 7/1998 | Wither | |
| 5,786,645 A * | 7/1998 | Obidniak | 310/68 R |
| 5,844,341 A * | 12/1998 | Spooner | F03D 9/002 310/112 |
| 5,945,766 A * | 8/1999 | Kim et al. | 310/268 |
| 5,949,613 A | 9/1999 | Moir et al. | |
| 5,955,807 A | 9/1999 | Kajiura et al. | |
| 6,002,193 A * | 12/1999 | Canini | H02K 3/46 310/101 |
| 6,005,320 A * | 12/1999 | Kim | H02K 21/24 310/114 |
| 6,011,339 A | 1/2000 | Kawakami | |
| 6,140,782 A | 10/2000 | Chin | |
| 6,155,364 A | 12/2000 | Nagano et al. | |
| 6,255,756 B1 | 7/2001 | Richter | |
| 6,445,105 B1 * | 9/2002 | Kliman | H02K 1/14 310/156.35 |
| 6,531,799 B1 | 3/2003 | Miller | |
| 6,545,444 B2 | 4/2003 | Bedini | |
| 6,555,944 B1 | 4/2003 | York | |
| 6,590,312 B1 | 7/2003 | Seguchi et al. | |
| 6,600,244 B2 | 7/2003 | Okazaki et al. | |
| 6,803,696 B2 | 10/2004 | Chen | |
| 6,833,646 B2 | 12/2004 | Joong et al. | |
| 6,841,916 B2 | 1/2005 | Chiarenza | |
| 6,948,461 B1 | 9/2005 | Kotwicki | |
| 7,042,122 B1 * | 5/2006 | Dufala | H02K 3/47 310/179 |
| 7,109,671 B2 | 9/2006 | Bedini | |
| 7,126,309 B1 | 10/2006 | Takeuchi et al. | |
| 7,187,098 B2 | 3/2007 | Hasebe et al. | |
| 7,202,620 B2 | 4/2007 | Petersen | |
| 7,250,704 B1 | 7/2007 | Sortore et al. | |
| 7,298,063 B2 | 11/2007 | Cunningham | |
| 7,719,147 B2 | 5/2010 | Palmer et al. | |
| 7,906,925 B2 | 3/2011 | Takeuchi | |
| 2003/0057796 A1 * | 3/2003 | Fan et al. | 310/216 |
| 2003/0193264 A1 * | 10/2003 | Pyntikov et al. | 310/254 |
| 2004/0124796 A1 * | 7/2004 | Bailey | H02K 1/141 318/400.4 |
| 2005/0012475 A1 | 1/2005 | Takeuchi | |
| 2005/0045392 A1 | 3/2005 | Maslov et al. | |
| 2005/0140244 A1 * | 6/2005 | Yamada et al. | 310/268 |
| 2005/0179337 A1 | 8/2005 | Hasebe et al. | |
| 2006/0219447 A1 * | 10/2006 | Saitou et al. | 180/65.2 |
| 2006/0220491 A1 * | 10/2006 | Takeuchi | 310/266 |
| 2006/0244320 A1 | 11/2006 | Guo et al. | |
| 2006/0284507 A1 | 12/2006 | Murakami | |
| 2007/0052314 A1 | 3/2007 | Hsu | |
| 2007/0236099 A1 * | 10/2007 | Kim et al. | 310/266 |
| 2007/0290582 A1 * | 12/2007 | Han et al. | 310/68 R |
| 2008/0024044 A1 | 1/2008 | Palmer et al. | |
| 2008/0067965 A1 * | 3/2008 | Bailey | H02K 1/141 318/561 |
| 2008/0088200 A1 | 4/2008 | Ritchey | |
| 2008/0119314 A1 | 5/2008 | Usoro | |
| 2008/0136282 A1 * | 6/2008 | Okazaki et al. | 310/156.36 |
| 2009/0278481 A1 | 11/2009 | Palmer | |
| 2010/0085005 A1 | 4/2010 | Palmer et al. | |
| 2010/0187931 A1 | 7/2010 | Palmer et al. | |
| 2011/0115327 A1 * | 5/2011 | Pan | 310/156.36 |
| 2013/0147418 A1 | 6/2013 | Palmer et al. | |

FOREIGN PATENT DOCUMENTS

| | | | |
|---|---|---|---|
| CN | 1160943 A | 10/1997 | |
| CN | 1215241 A | 4/1999 | |
| CN | 1596494 A | 3/2005 | |
| CN | 2854905 Y | 1/2007 | |
| CN | 101092955 A | 12/2007 | |
| EP | 1174989 A1 | 1/2002 | |
| EP | 1870990 A2 | 12/2007 | |
| JP | 49149911 U | 12/1974 | |
| JP | 54041406 Y2 | 12/1979 | |
| JP | 59183180 A | 10/1984 | |
| JP | 5199793 A | 8/1993 | |
| JP | 5219788 | 8/1993 | |
| JP | 2000050604 A | 2/2000 | |
| JP | 2000197386 A | 7/2000 | |
| JP | 2000209894 A | 7/2000 | |
| JP | 2002034214 A * | 1/2002 | H02K 16/02 |
| WO | WO9718617 A1 | 5/1997 | |
| WO | WO9828838 A1 | 7/1998 | |
| WO | WO03003547 A1 | 1/2003 | |
| WO | WO2004057738 A1 | 7/2004 | |
| WO | WO 2006068042 A1 * | 6/2006 | H02K 21/24 |
| WO | WO2007140624 A1 | 12/2007 | |
| WO | WO2008007510 A2 | 1/2008 | |

OTHER PUBLICATIONS

Hanselman, D., "Brushless Permanent-Magnet Motor Design," McGraw-Hill, 1994, pp. 1-39, 61-101, 103-123, 125-153 and 155-181.
Authorized officer Hanh Nguyen, International Search Report in Application No. PCT/US2007/73165 dated Aug. 22, 2008, 2 pages.
Authorized officer Blaine R. Copenheaver, International Search Report and Written Opinion in Application No. PCT/US2009/054082 dated Aug. 17, 2009, 13 pages.
Authorized officer Blaine R. Copenheaver, International Search Report and Written Opinion in Application No. PCT/US2009/054049 dated Sep. 24, 2009, 13 pages.
Authorized officer Horacio Ramos, International Search Report and Written Opinion in Application No. PCT/US2009/043042 dated May 7, 2010, 13 pages.
First Office Action in Application No. 200780035582.5 dated Aug. 5, 2010, 14 pages.
Authorized officer Lee Young, International Preliminary Report on Patentability in Application No. PCT/US2009/054082 dated Oct. 21, 2010, 10 pages.
Korean Intellectual Property Office, Office Action in Application No. 10-2009-7003965 dated Oct. 27, 2010, 7 pages.
Office Action in Application No. 2009-521885 dated Oct. 31, 2011, 4 pages.
Authorized officer Brian Sircus, International Preliminary Report on Patentability in Application No. PCT/US2009/054049 dated Feb. 9, 2012, 10 pages.
Office Action in Application No. 2009-521885 dated Jul. 12, 2012, 5 pages.
Examination report in Chinese Patent Application No. 200980141218.6, dated Jan. 29, 2013, w/English translation, 16 pages.
Office Action in Chinese Patent Application No. 200980141219.0, dated Feb. 5, 2013, w/English translation, 8 pages.
Supplementary European Search Report for EP 07812757.8, dated Dec. 12, 2012, 11 pages.
Official Communication for EP 07812757.8, dated Jan. 16, 2014, 4 pages.
Office Action in Chinese Patent Application No. 201210151154.1, dated Jan. 26, 2014, with English translation, 9 pages.
Office Action in Chinese Patent Application No. 200980141218.6, dated May 19, 2014, with English translation, 14 pages.

(56) References Cited

OTHER PUBLICATIONS

Office Action in Chinese Patent Application No. 200980141218.6, dated Jan. 29, 2015, with English translation, 7 pages.
European Search Report for EP 09807419.8, dated Jul. 22, 2015, 3 pages.
Official Communication for EP 09807419.8, dated Aug. 12, 2015, 6 pages.
Supplementary European Search Report for EP 09816662.2, Dec. 1, 2015, 6 pages.
Official Communication for EP 09816662.2, Dec. 11, 2015, 7 pages.

* cited by examiner

| Ratio of Magnets to Coils | Phase |
|---|---|
| 1.077 | 13 |
| 1.083 | 12 |
| 1.100 | 10 |
| 1.111 | 9 |
| 1.129 | 8 |
| 1.143 | 7 |
| 1.154 | 13 |
| 1.167 | 6 |
| 1.200 | 5 |
| 1.222 | 3 |
| 1.231 | 13 |
| 1.250 | 4 |
| 1.286 | 7 |
| 1.300 | 10 |
| 1.308 | 13 |
| 1.333 | 3 |
| 1.375 | 8 |
| 1.385 | 13 |
| 1.400 | 5 |
| 1.417 | 12 |
| 1.429 | 7 |
| 1.444 | 9 |
| 1.462 | 13 |
| 1.500 | 2 |
| 1.533 | 15 |
| 1.538 | 13 |
| 1.556 | 9 |
| 1.571 | 7 |
| 1.583 | 12 |
| 1.589 | 12 |
| 1.600 | 5 |
| 1.615 | 13 |
| 1.625 | 8 |
| 1.667 | 3 |
| 1.682 | 11 |
| 1.700 | 10 |
| 1.714 | 7 |
| 1.750 | 4 |
| 1.778 | 9 |
| 1.800 | 5 |
| 1.833 | 6 |
| 1.846 | 13 |
| 1.857 | 7 |

| Ratio of Magnets to Coils | Phase |
|---|---|
| 1.875 | 8 |
| 1.889 | 9 |
| 1.900 | 10 |
| 1.917 | 12 |
| 1.923 | 13 |
| 2.000 | 1 |
| 2.083 | 12 |
| 2.100 | 10 |
| 2.125 | 8 |
| 2.143 | 7 |
| 2.157 | 8 |
| 2.222 | 9 |
| 2.250 | 4 |
| 2.286 | 7 |
| 2.300 | 10 |
| 2.333 | 3 |
| 2.375 | 8 |
| 2.400 | 5 |
| 2.417 | 17 |
| 2.427 | 7 |
| 2.429 | 7 |
| 2.444 | 9 |
| 2.500 | 2 |
| 2.556 | 9 |
| 2.571 | 7 |
| 2.583 | 12 |
| 2.625 | 8 |
| 2.667 | 3 |
| 2.700 | 10 |
| 2.714 | 7 |
| 2.750 | 4 |
| 2.778 | 3 |
| 2.833 | 8 |
| 2.857 | 7 |
| 2.875 | 8 |
| 2.917 | 12 |
| 3.000 | 1 |
| 3.083 | 12 |
| 3.125 | 8 |
| 3.143 | 7 |
| 3.400 | 5 |
| 3.500 | 2 |
| 4.000 | 1 |

FIG. 27

REGENERATIVE MOTOR AND COIL

CROSS-REFERENCE TO RELATED APPLICATIONS

This application is a divisional of U.S. patent application Ser. No. 12/542,412 filed Aug. 17, 2009, which in turn claims priority to provisional application No. 61/188,994 filed Aug. 15, 2008. The entire contents of the previous applications are incorporated by reference as if fully set forth herein.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention relates generally to electric motors, and more particularly to a regenerative motor with a novel coil.

2. Description of Related Art

In conventional motors, the iron, around which a copper wire is wound, is used to transmit the flux from where it is created from the copper windings to where it is needed to be used at the rotor/stator interface area.

SUMMARY OF THE INVENTION

The motor according to the present invention is a highly efficient electric motor which can be embodied in several configurations, including a standard motor, a huh motor, a linear motor, or other motor configuration. As a regenerative device, the motor may also act as a part-time or full-time electrical generator.

In regenerative motors, coils and cores are important elements of the design. The cores in the coils contain minimal or no iron-based materials, depending on the embodiment and design performance requirements, and are used to produce magnetic flux at the point of use rather than transmitted through iron or iron laminates from a point of creation to a point of use. As the invention contains discrete coils in most embodiments, not all of the coils must be used as full-time motor coils or generator coils. Some applications may require simultaneous use of some coils as motor driver coils and others as generator coils. For example, a portion of the generator coils may be used as a transformer of power to produce a unique required voltage or current for a given load as opposed to using a standalone transformer or other solid-state regulation device. As a second example, the motor may operate using some or all of the coils to drive a load and later an operator may signal for the motor to act as a generator, using some or all of the coils for regenerative braking, such as in an electric vehicle application. Coils may also be disabled in an individual or collective basis as needed for incremental increase or decrease of motor torque output or generator input.

In motor configurations, the coils are controlled by an electrical timing system, which inputs electrical energy into the coils in a cyclical +/− and −/+ alternation fashion. Timing can be adjusted by retarding or advancing the point at which the electrical input switches from +/− to −/+ and −/+ to +/−. The adjustment of the timing can affect both torque and speed. Optimal timing results in higher efficiency relative to suboptimal timing.

In generator configurations, the coils can be used to drive a load, usually through a power rectification device converts the alternating current to direct current.

In embodiments where the motor is used as a part time motor and generator, the circuit is preferably capable of switching between the coil power switching circuit path and the rectifier output circuit path.

In a standard motor configuration where the stator is stationary and the rotor rotates, the motor according to the present invention is an electric motor that 1) contains one or more stationary stators, each of which optimally has a rotor on each side of each stator with a single rotor between each stator segment, 2) optimally, a shunt path outside of the rotor on each end of the stator/rotor stack, 3) one or more magnets in the rotors arrayed as described in this description of the invention, 4) one or more coils in the stators arrayed as described in this description of the invention, 5) internal or external motor control circuitry, 6) optionally includes an epicyclic gear set within one or more of the rotors, and 7) optionally includes a locking or clutch mechanism for locking the ring gear of the epicyclic gear set relative to the motor housing or stators.

In a hub motor configuration, the motor according to the present invention is an electric motor that 1) attaches to a stationary or moving spindle or axle, 2) contains one or more stators of rotors optimized for maximum performance based on permanent magnetic in the rotor and coils in the stator using a minimum of iron-based core material, 3) internal or external motor control circuitry, 4) connects to internal or external energy storage, 5) optionally includes a system for receiving remote control instructions, 6) optionally includes a system for sending remote status updates to a central control computer, 7) optionally includes an internal epicyclic gear set, 8) optionally includes a locking or clutch mechanism for locking the spindle to the motor output.

In a linear motor configuration, the present invention is an electric motor that contains 1) a linear stator and rotor or linear stator/rotor stack, 2) rotors having one or more magnets, and 3) stators having one or more coils.

Radially-oriented motors are variations from the above motors (and generators) in that the magnets and coils (or coils and coils) are oriented along radials rather than axial parallels. For example, in a standard motor configuration the motor could be configured with magnets around a rotor on the outer cylindrical surface and coils could then be placed on a stator configured in a concentric array aligned radially from the rotor. This concept is also able to be used in rotor/stator stacks, or multiple concentric arrays of magnets and coils or arrays of coils on a rotor and coils on a stator. The design could be scaled by adding more concentric arrays or by stacking multiple sections of concentric arrays along the motor axis.

The present invention can be embodied in other motor configurations, including but not limited to pancake motors and cup motors. In preferred embodiments, the coils drive or are driven by permanent magnets; however, in other embodiments the coils can be used to drive or be driven by other coils.

Accordingly, in one aspect of the present invention, there is provided a motor composed of a stator and a rotor. The stator has an array of coils arranged therein. The rotor has an array of magnets arranged therein. Each of the coils includes a first winding of wire wrapped around a core, and the wire has a non-circular cross-section.

Preferably, the wire is a flattened wire. Preferably, each of the coils further includes a second winding of wire wrapped around the core. Preferably, the first and second windings are made up of a singe wire, and the first and second windings are oriented opposed to each other. The windings cane be formed in a first printed circuit board in a spiral form.

Preferably, the motor has a plurality of coil modules and each of the coils is arranged in each of the coil modules.

Preferably, the core is a substantially ironless core. The core can be an air core.

Preferably, the core has a shape generally matching a cross-sectional shape of the magnet. Preferably, the core is non-circular.

The core can be composed of a gauge wire. Alternatively, the core is composed of thin steel with a slit.

The motor can be a hub motor. Alternatively, the motor can be a linear motor. Preferably, the motor can be a regenerative motor, and each of the coils can be regulated separately. Additionally or alternatively, the motor can include an epicycle gear set.

In an alternative embodiment, there is provided a motor having a stator and a rotor. The stator has an array of coils arranged in the stator, and the rotor has an array of magnets arranged in the rotor. Each of the coils has a winding of wire wrapped around a core, each of the magnet has a first pole face, a second pole face and a middle portion between the first pole face and the second pole face. The first pole face is narrower than the middle portion.

Preferably, the second pole face is narrower than the middle portion. Preferably, the magnet has a first step formed adjacent to the first pole face. The magnet can further have a second step formed adjacent to the second pole face. The first and second steps can be pie-shaped steps. Alternatively, the magnet can have an angled edge formed adjacent to the first pole face.

The array of magnets can be arranged circumferentially around an axis of the rotor. In this embodiment, the magnet has an inner end disposed close to the axis of the motor and an outer end disposed remote from the axis of the motor. The inner end of the magnet is preferably narrower than the outer end of the magnet. Preferably, the inner end of the first pole face of the magnet is narrower than the outer end of the first pole face of the magnet. Each of the magnets can be composed of two or more magnet pieces stacked one on top of the other. Preferably, the core has a shape generally matching a shape of the first pole face of the magnet.

In an alternative embodiment, there is provided a motor having a stator and a rotor. The stator has an array of coils arranged in the stator, and the rotor has an array of magnets arranged in the rotor. Each of the coils has a winding of wire wrapped around a core. The core has a first pole face, a second pole face and a middle portion between the first and second pole faces. In this embodiment, the middle portion has a reduced width than the first and second pole faces.

In an alternative embodiment, there is provided a motor having a stator and a rotor. The stator has an array of coils arranged in the stator, and the first rotor has an array of magnets arranged in the first rotor. Each of the coils has a winding of wire wrapped around a core. Each of the magnets has a width, a length, and a height. The core has a width, a length, and a height. In this embodiment, each of the magnets is distanced from adjacent magnets by a magnet distance, and the magnet distance is no less than the width of the magnet.

Preferably, the magnet distance is no more than the length of the magnet. The motor can further have a second rotor having an array of magnets arranged in the second rotor. The magnet of the first rotor is distanced from an adjacent one of the magnets of the second rotor by a magnet gap, and the magnet distance is no less than the magnet gap.

Preferably, the width of the core is no less than the width of the magnet. Preferably, the height of the magnet is no less than the height of the core.

In another aspect of the present invention, there is provided a coil module for a motor. The coil module includes a core and a first winding of a wire wrapped around the core. The wire has a non-circular cross-section.

The wire can be a conductor path printed on a printed circuit board in a spiral form. The wire can be a flattened wire.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The above and other objects and features of the present invention will become apparent from the following description of preferred embodiments given in conjunction with the accompanying drawings, in which:

FIG. 27 shows a table of the number of phases at a given ratio of magnets to coils.

DETAILED DESCRIPTION OF THE INVENTION

Figure 1:
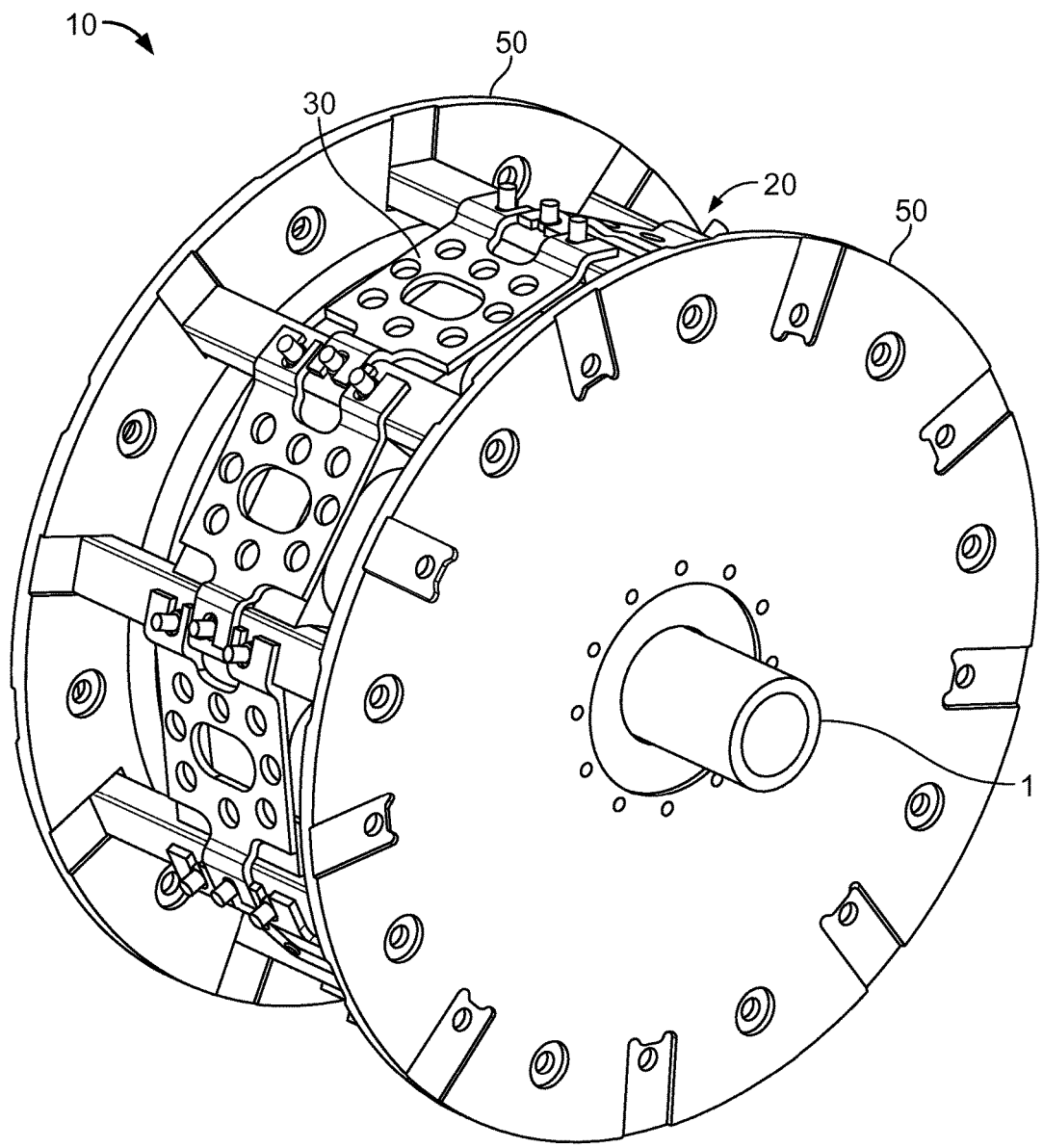
FIG. 1 is a perspective view of an embodiment of a motor according to the present invention.
Figure 2:
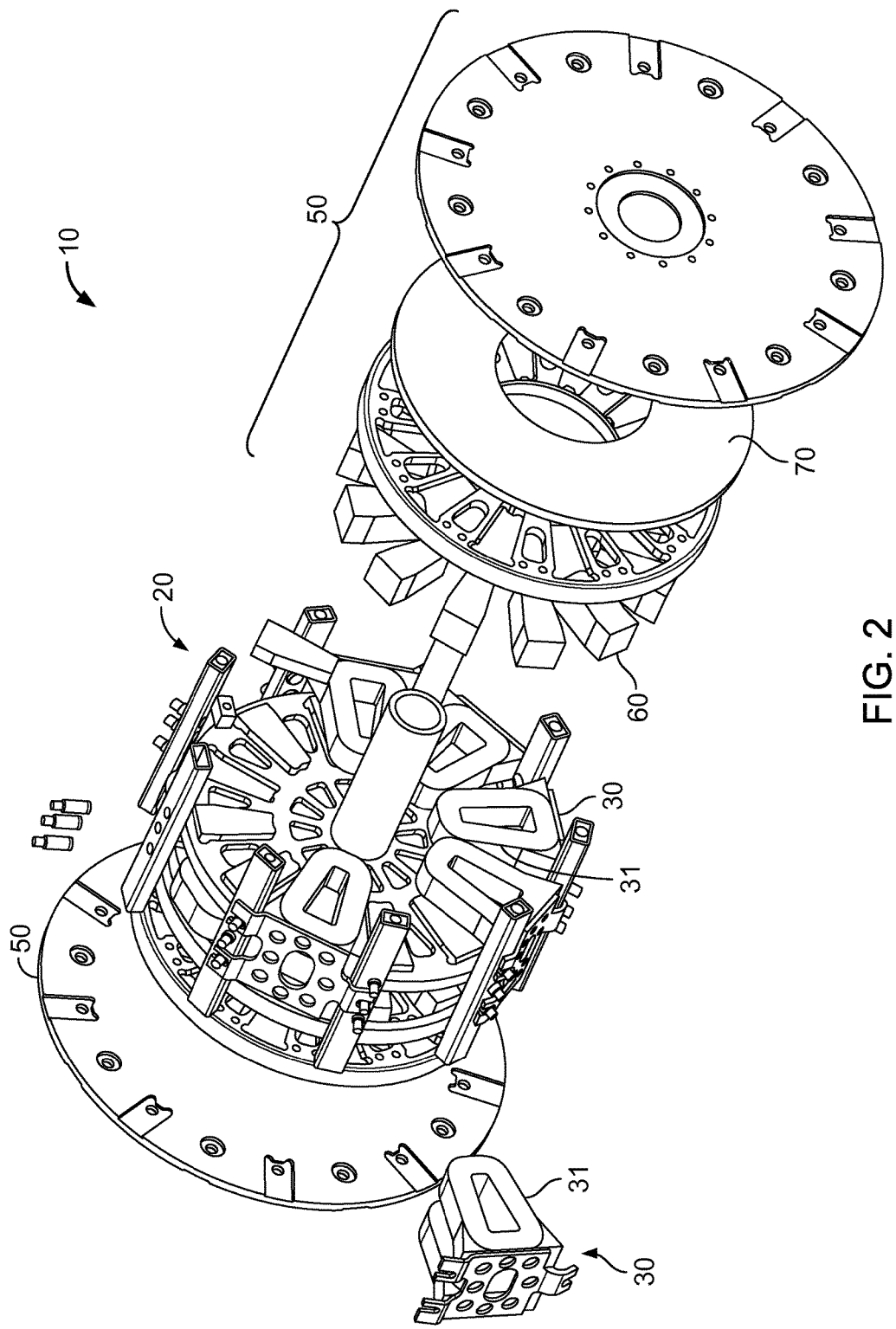
FIG. 2 is a partially exploded view of the motor of FIG. 1.

Shown in FIGS. 1 and 2 is a motor 10 that comprises a stator 20 sandwiched between a pair of rotors 50. FIG. 2 is a partially exploded view of the motor 10. The motor 10 shown in FIGS. 1 and 2 uses a single rotor-stator-rotor configuration. The stator 20 has one or more arrays of coil 31. Each of the rotors 50 has one or more arrays of magnets 60. The design may be scaled to include fewer or more magnets 60 per rotor section 50 or fewer or more coils 31 per stator section 20. In the case of an induction motor, the rotor 50 will contain an array of coils instead of magnets.

The number of stator-rotor sections versus stator and rotor thicknesses can be optimized for best performance versus cost as a given application demands. Best performance can be achieved when the thickness of the stator 20 does not exceed the twice the thickness of the magnets 60 in a given rotor 50. It is possible to use different thicknesses of rotors 50 and stators 20 and different individual thicknesses for any given rotor 50 or stator 20. It may be optimal to use a thicker rotor 50 at each axial end of the motor 10.

A "stator-rotor section" in a rotary motor (or generator) is defined to be an axially positioned rotor 50 followed by an axially positioned stator 20 followed by an axially positioned rotor 50. A "stator-rotor stack" is defined to be a rotor 50 followed by a stator 20 followed by a rotor 50 followed by a stator 20 followed by a rotor 50 in a repeating pattern where each end of the stack is preferably a rotor 50 ("end rotor"), preferably configured with a magnetic shunt path 70 on the axially outer ends of the stack. The stator-rotor sections in the stack are counted by the number of stators 20 in the stack.

A "stator-rotor section" in a linear motor (or generator) is defined to be linearly positioned and arrayed rotor 50 next to a linearly positioned and arrayed stator 20 followed by a linearly positioned and arrayed rotor 50, stator 20 being used to describe the stationary component and rotor 50 being used to describe the moving part, although both parts can be configured to move as needed. The rotor 50 or the stator 20 may contain the coils 31 or the magnets 60 as needed. A "stator-rotor stack" in a linear motor is defined to be a rotor 50 positioned next to a stator 20 followed by a rotor 50 positioned next to a stator 20 followed by a rotor 50 in a repeating pattern where each end of the stack is preferably a rotor 50 ("end rotor"), preferably configured with a magnetic shunt path 70 on the axially outer ends of the stack. The stator-rotor sections in the stack are counted by the number of stators 20 in the stack.

Each of the herein described embodiments may be configured as a motor, a generator, or a part-time motor and generator, or a partial motor and partial generator as determined by the number of coils 31 used as driver coils or generator coils, noting that any one coil 31 may be configured to change as needed from generator to motor operating modes.

In the embodiment illustrated in FIGS. 1 and 2, the stator 20 has a plurality of coil modules 30. As best seen in FIG. 3, each of the coil modules 30 has a coil 31. The coil 31 is composed of a pair of windings 32 around a core 34. Alternatively, the coil module 30 may have a single winding 32 or may have more than two windings 32. In the illustrated embodiment, the core 34 is in a non-circular shape. As shown in FIGS. 4, 5, 6, 8, 9 and 10, the core 34 can be formed in a circular shape. The winding 32 is preferably made up a wire 33 with a good conductivity, such as copper. The wire 33 is preferably insulated.

Figure 4:
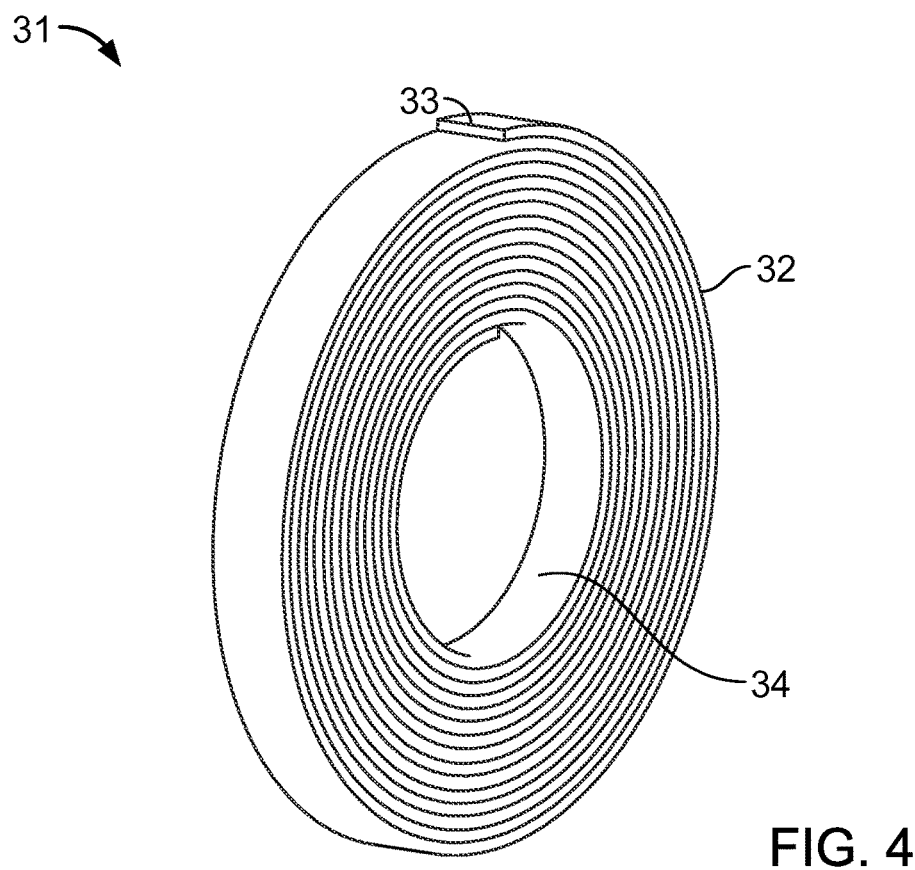
FIG. 4 is a perspective view of a variant of the coil according to the present invention, wherein the coil is made up of a winding of a flattened wire wrapped around a circular air core.

In the embodiment illustrated in FIG. 4, the wire 33 is flattened and wrapped around the core 34 which is in a circular shape. The using of the flattened wire 33 can help minimize the air gaps, optimize the magnetic flux pattern, and increase the integrity of the winding 32. The wire 33 may be otherwise non-circular in cross-sectional shape. Still, the wire 33 may be circular in cross-sectional shape as conventional.

Figure 5:
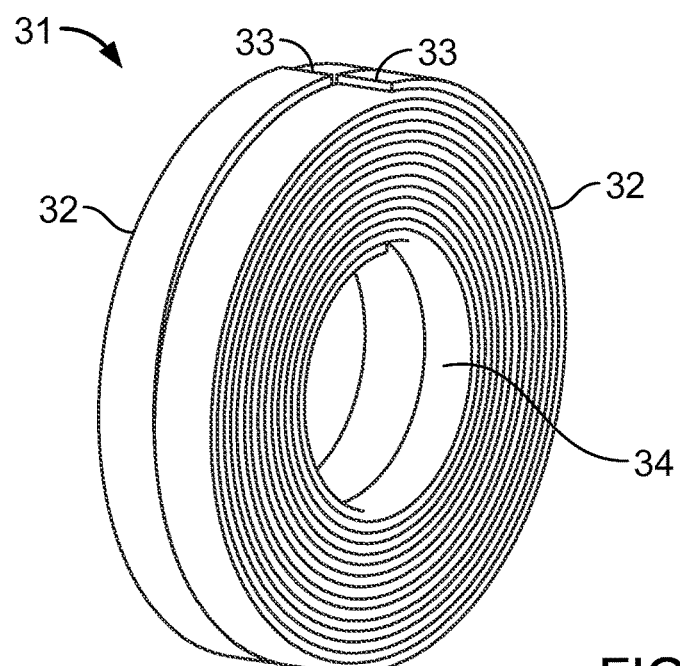
FIG. 5 is a perspective view of another variant of the coil according to the present invention, wherein the coil comprises two sets of side-by-side windings of a flattened wire wrapped around a circular air core, with the windings oriented opposed to each other.
Figure 6:
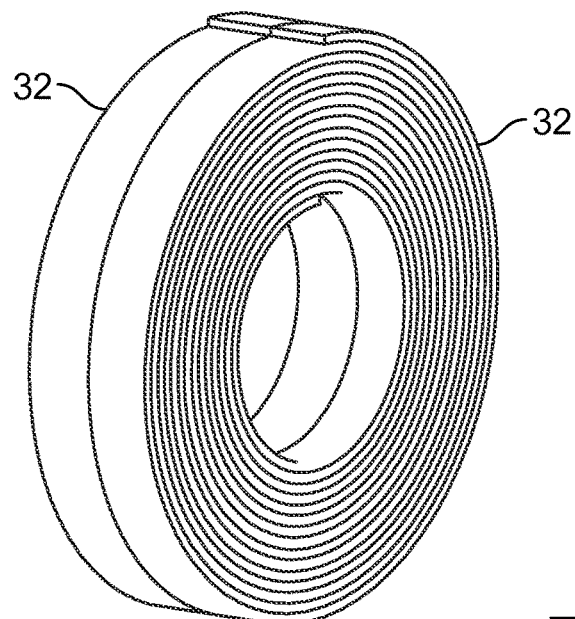
FIG. 6 is a perspective view of another variant of the coil according to the present invention, wherein the coil comprises two sets of side-by-side windings of a flattened wire wrapped around a circular air core, with the windings oriented in the same direction

In the embodiment as illustrated in FIG. 5, the coil 31 is made up of two side-by-side windings 32 of flattened wire 33. The flattened wire 33 is wound continuously from the center side to the outside to form a winding 32, and then the same wire 33 is again wound from the center side to the outside to form a separate winding 32 so that two windings 32 made up of the single wire 33 are arranged side-by-side on the same core 34. Because the two windings 32 are made up of the same wire 33, both ends of the wire 33 are disposed at the outside of the windings 32. This side-by-side windings can be repeated over and over on the same core 34 in groups of even numbers of windings 32 so that both ends of the wire 33 can always be located either at the center side or at the outside of the windings 32. In FIG. 5, the two windings 32 are oriented opposed to each other. The opposed orientation promotes an optimal through-coil magnetic flux creation. Alternatively, the two windings 32 may be oriented in the same direction as shown in FIG. 6.

Although even numbers of windings 32 are preferred, odd numbers of windings 32 may also be used if the designer desires to have a central wire end and an outer wire end. However, leaving a single wire to cross from the center side to the outside of the windings 32 can distort the induced magnetic flux field and reduce coil performance and efficiency.

Figure 7:
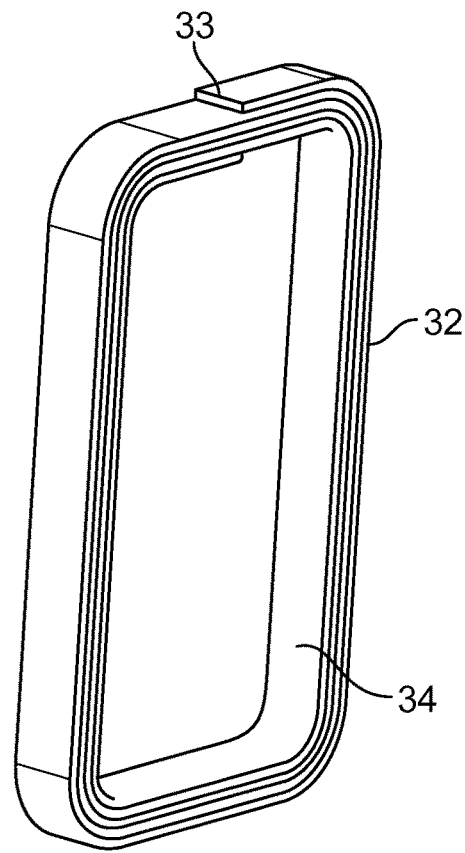
FIG. 7 is a perspective view of another variant of the coil according to the present invention, wherein the coil comprises a winding of a flattened wire wrapped around a generally rectangular air core.

In the embodiment as illustrated in FIG. 7, the coil 31 is made up of a winding 32 of a flattened wire 33 wrapped around a rectangular core 34. As in FIG. 5 or 6, two or more windings 32 can be arranged side-by-side. In addition, the core 34 may be non-circular and non-rectangular.

In FIGS. 4, 5, 6 and 7, no wires are left across the face of the winding 32. The wire 33 is wound so that both ends of the wire 33 where they need to be connected to a power source are located on the outside of the winding 32. Alternatively, both ends of the wires 33 can be located on the same inner side of the coil 32 (or other convenient location). Preferably, each winding 32 is designed so that it will function as a stand-alone coil, even if included in a parallel or series chain of additional windings.

In FIGS. 4, 5, 6 and 7, the wire 33 is wound such that the larger flat surface thereof is facing in a direction perpendicular to an axis of the coil 31. However, it is also possible that the wire 33 is wound such that the larger flat surface thereof is facing in a direction parallel with the axis of the coil 31.

The individual windings 32 may be bonded together with an appropriate insulator or bonding agent to prevent movement or give the coil 31 an overall structural integrity. The coils 31 may be encapsulated in another material, such as plastic, or may be sandwiched between other thin materials for additional structural integrity.

Figure 8:
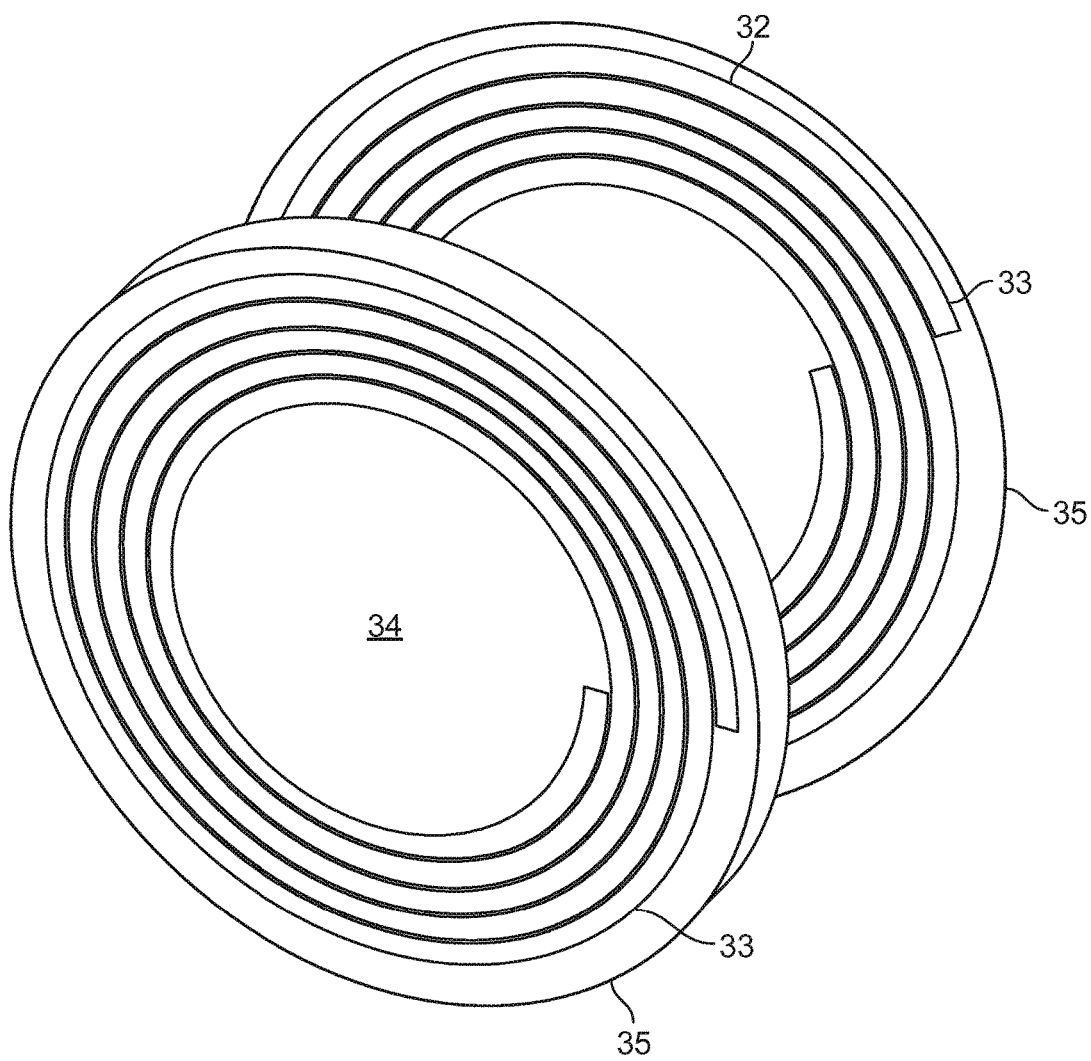
FIG. 8 is a perspective view of another variant of the coil according to the present invention, wherein the coil is formed by layering a plurality of printed circuit boards.

In the embodiment as illustrated in FIG. 8, the coil 31 can be made up of a plurality of printed circuit boards 35. Each of the printed circuit boards 35 has a conductor path 33a printed therein in a spiral shape about the core 34 so as to form a winding 32. Accordingly, the plurality of printed circuit boards 35 are layered to form a plurality of windings 32. Alternatively, the coil 31 may be composed of a single printed circuit board 35 to form a single winding 32. The printed conductor path 33a can have circular or other concentric shape, which generally matches the shape of the core 34, which in turn generally matches the shape of the magnet 60.

Figure 3A:
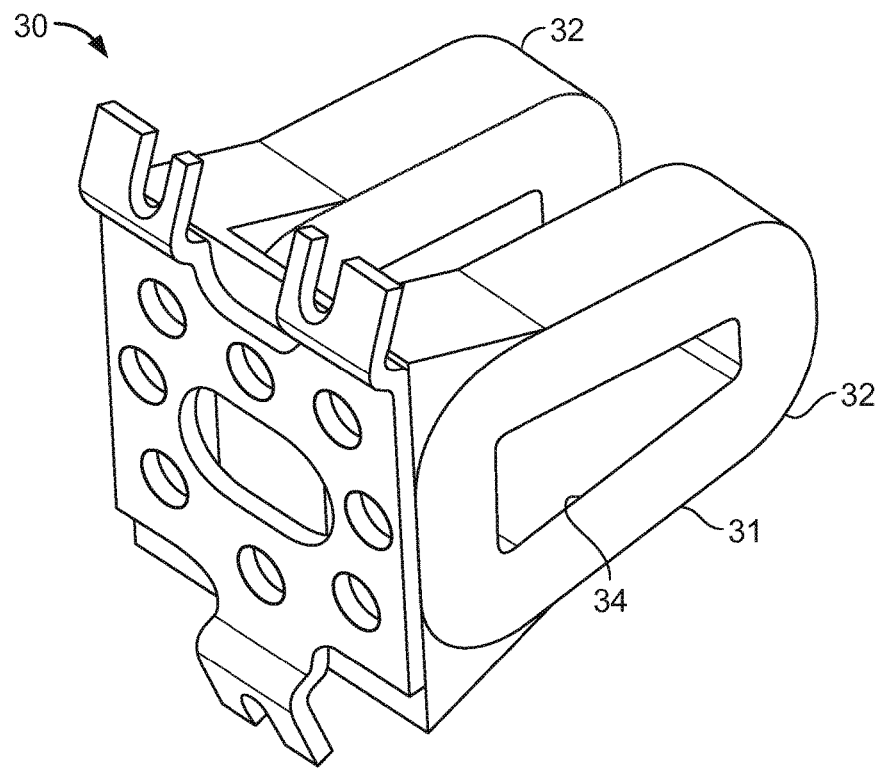
FIG. 3A is an enlarged view of the coil module of the stator of the motor of FIG. 1.
Figure 3B:
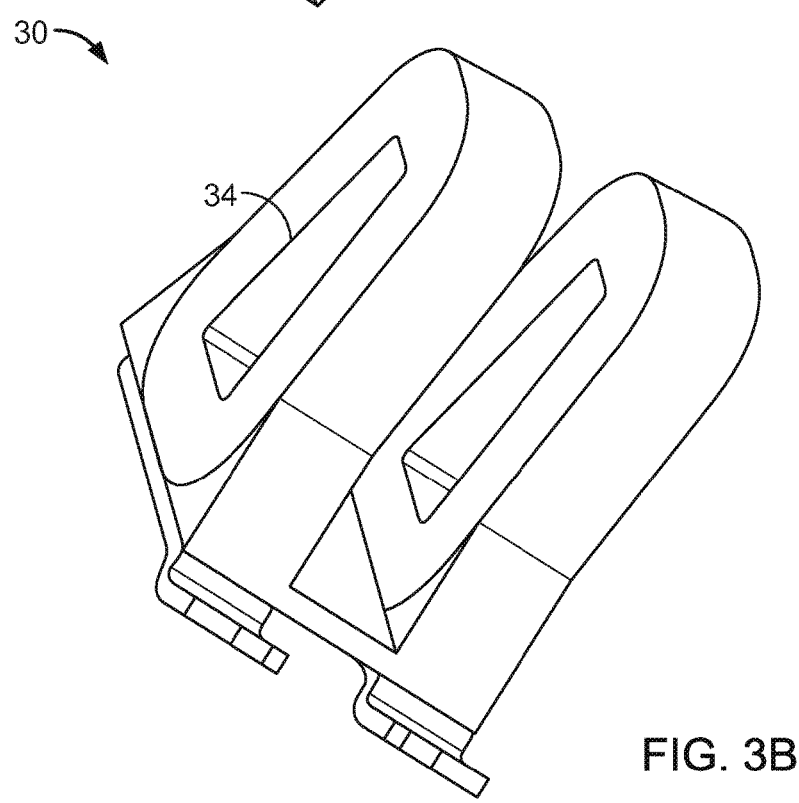
FIG. 3B is another enlarged view of the coil module of FIG. 3A from a different direction.

As shown in FIGS. 4, 5 and 6, the coils 31 may be wrapped around a circular core shape, or as shown in FIGS. 3A, 3B and 7 the coils 31 may be wrapped around a non-circular shape. The coils 31 are preferably composed of a good conductor such as copper. The windings 32 are preferably composed of insulated wire 33. The wire 33 may be circular or non-circular in cross-sectional shape. As shown in FIGS. 4, 5 and 6, a flattened wire is particularly effective. As shown in FIG. 8, the windings 32 may be made up of multiple layered circuit boards 35 with circular, spiral, or other concentric shapes which generally match the shape of the core 34, which generally matches the shape of the magnet 60.

As best seen in FIG. 2, the cross-sectional shape of the core 34 is preferably similar to or exactly the same with the normal, or facing, cross-sectional shape of the magnets 60 of the rotor 50. The cross-sectional size of the core 34 is also preferably similar to or the same with the normal, or facing, cross-sectional size of the magnets 60. This core design allows for maximum focus of the magnetic flux perpendicular toward the magnets 60 of the rotor 50 while minimizing any resistance (and therefore loss) to the flux.

As best seen in FIGS. 2 and 3, the stator 20 is composed of an array of coils 31. Three stator categories are used: an integrated stator where the coils 31 and stator 20 are bonded together as a single unit or module, a partially integrated stator where some of the coils 31 are bonded together as a single unit or module, and a unitized stator where individual coils 31 are separately used whether exposed or encapsulated for ease of individual coil replacement for a completely modular design with a single coil 31 as the basic unit of the modular design.

Multiple stators 20 can be linked together using axially aligned support structures and coil modules 30 or groups of coils 31 can be linked in the axial direction. Individual coils 31 within the stator 20 may be wired in parallel or series or in parallel/series combinations as needed for optimal use of the available current and voltage from an available power source. The electronics interfacing with the stator coils 31 can be configured to switch the coils 31 into parallel and series or combinations of parallel and series from stand-alone, series, parallel, or parallel/series combinations as needed on demand.

It may be advantageous in some designs to create a steel flux path from one coil 31 to the next coil 31 within the stator 20 in a path that does not cross excessively close to the magnet path. In high speed designs this option is not desirable.

Figure 9:
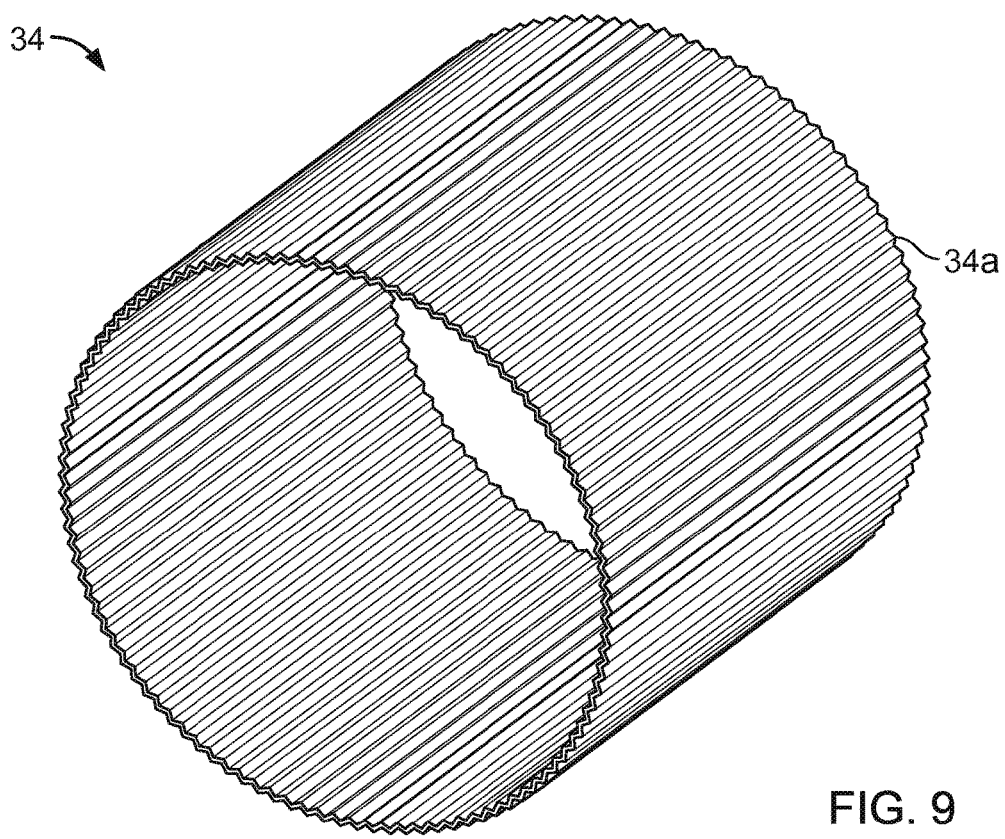
FIG. 9 is a perspective view of a variant of the core according to the present invention, wherein the core is made up of a series of small gauge wires.

The cores 34 used in the present invention can be made in multiple configurations and from multiple materials. In an embodiment as shown in FIG. 9, the core 34 can be made up of a series of small gauge wires 34a, which are preferably hard steel wires of a very small diameter. The distance between the gauge wires 34a is preferably less than the diameter of the gauge wire 34a for a better performance. Optimal spacing is obtained when each gauge wire 34a is spaced from the adjacent one by the same spacing distance as is equal to the diameter of the gauge wire 34a. However, a variety of spacing distances between the individual gauge wires 34a may also be possible. Wider spacing could be appropriate for higher RPM, lower efficiency designs. The gauge wires 34a can be oriented for optional directional focusing effect of the magnetic flux through the coil 31.

Figure 10:
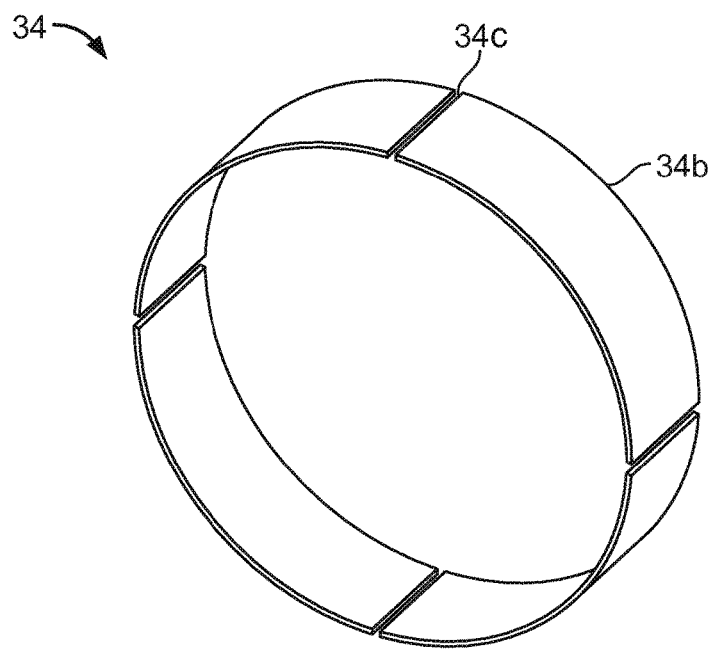
FIG. 10 is a perspective view of another variant of the core according to the present invention, wherein the core is made up of thin steel with slits.

In the embodiment as shown in FIG. 10, the core 34 is made up of thin steel 34b with one or more small breaks or slits 34c. The thin steel 34b can be hard steel with a width of a few thousands of an inch. The orientation of the thin steel 34b and the slits 34c can be selected for optional directional focusing effect of the magnetic flux through the coil 31. The slits 34c prevent the magnetic flux from inducing a current which travels around the core 34.

Figure 11:
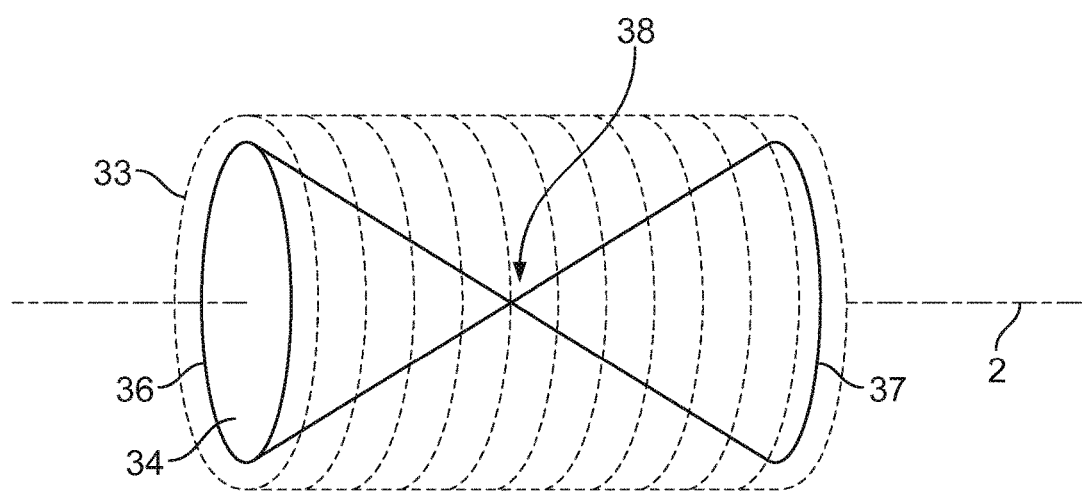
FIG. 11 is a perspective view of another variant of the core according to the present invention, wherein the core has a reduced width in the middle portion.

In the embodiment as illustrated in FIG. 11, the core 34 has a first pole face 36, a second pole face 37, and a middle portion 38 between the first and second pole faces 36, 37 along a center axis 2. The middle portion 38 has a reduced width than the first and second pole faces 36, 37. This configuration maintains the width of core at the pole faces 36, 37 while increasing the winding area and the number of turns in the middle portion 38. Accordingly, the flux is increased at the pole faces.

The core 34 of the present invention preferably uses little or no iron. In the case where a little iron is used, it is preferable to use hard steel as little as possible to focus the lines of force as needed. However, soft iron may also be used with some loss of efficiency. The present invention has been tested with small gauge piano wire, very thin, axially segmented shim material, tubes, and solid shapes. In conventional motors, iron cores are used to transmit the flux from where it is created from the copper windings to where it is needed to be used at the rotor/stator interface area. In the present invention, the flux does not need to be transmitted from a point of creation to a point of use because the flux is created right where it is needed to be used.

For a less expensive or easier to produce the core 34, a designer can use no core material at all (perhaps a non-ferrous core for coil winding purposes which may or may not be removed after winding), a soft iron-tube, or a thin layer of iron filings encased in a binder, ideally subjected to a magnetic field prior to the binder setting up.

High efficiency can be obtained with a lower speed materially optimized core design. However, in the case of high speed operations, an air core (no core) or a lesser amount of hard steel can be used.

While the most efficient core designs are shown in the embodiments presented here, the present invention also contemplates less efficient core designs, for which there are a variety of reasons to consider including manufacturing costs, reduction of electrical spike kick-back through the power circuits.

Rotors 50 are designed with one or more arrays of magnets 60 contained within the rotor 50. FIGS. 12A through 12D show variants of the magnet 60. The magnet 60 has an inner end 61 to be disposed close to the central axis 1 of the motor 10 and an outer end 62 to be disposed away from the central axis 1 of the motor 10. The magnet 60 also has a top surface 63 and a bottom surface 64. When the magnet 60 is mounted in the rotor 50, the top surface 63 faces toward the stator 20. In other words, the top surface 63 functions as a pole end.

Figure 12A:
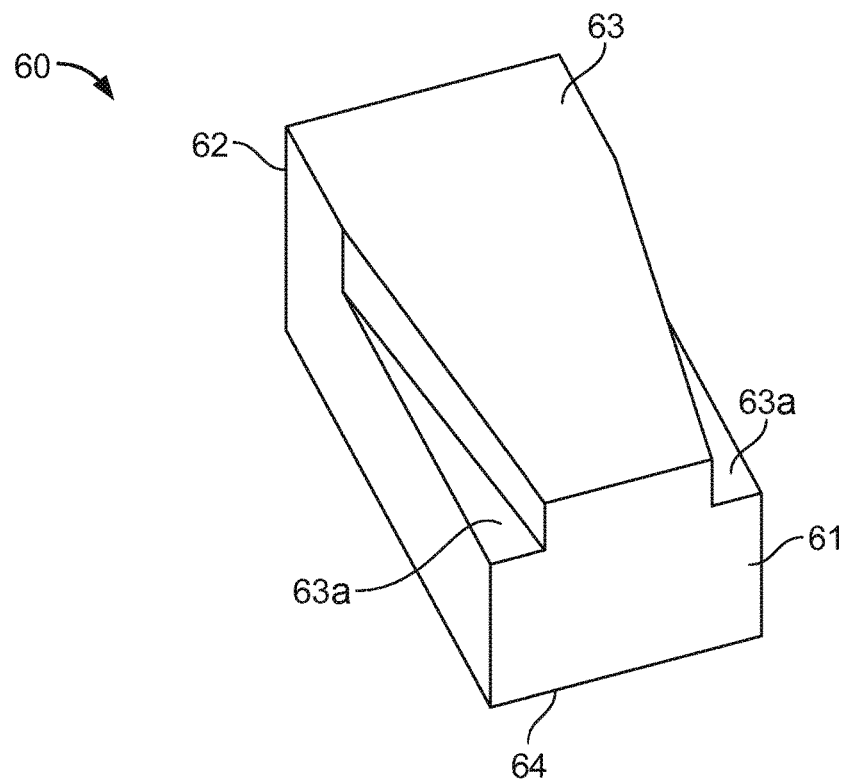
FIG. 12A is a perspective view of a variant of the magnet according to the present invention, wherein the magnet has a pie-shaped step at the narrow end on the top.
Figure 12B:
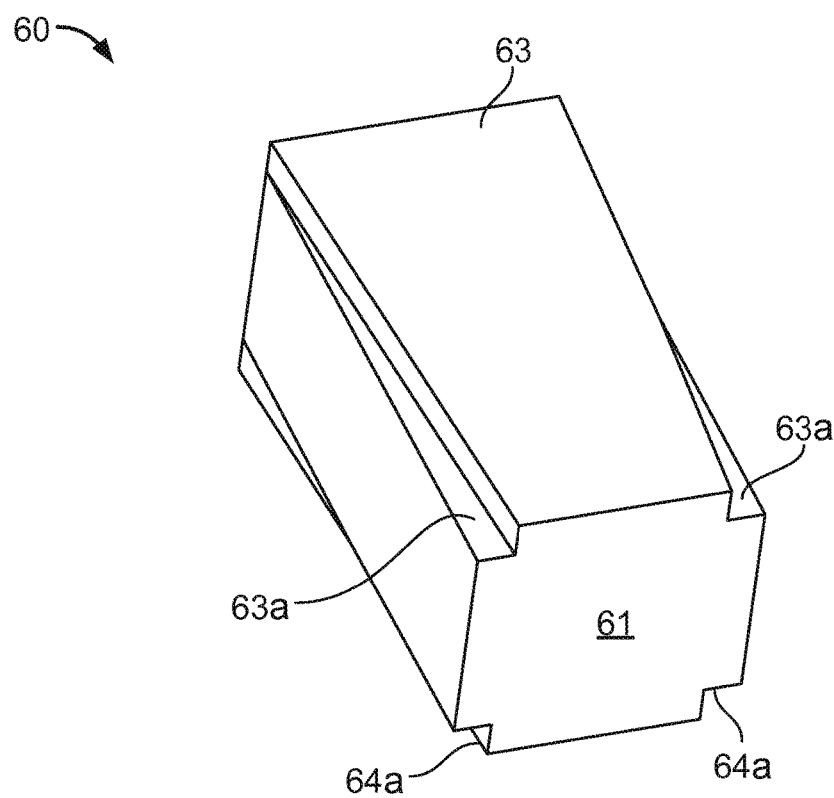
FIG. 12B is a perspective view of another variant of the magnet, wherein the magnet has two pie-shaped steps at the narrow end on the top and on the bottom, respectively.
Figure 12C:
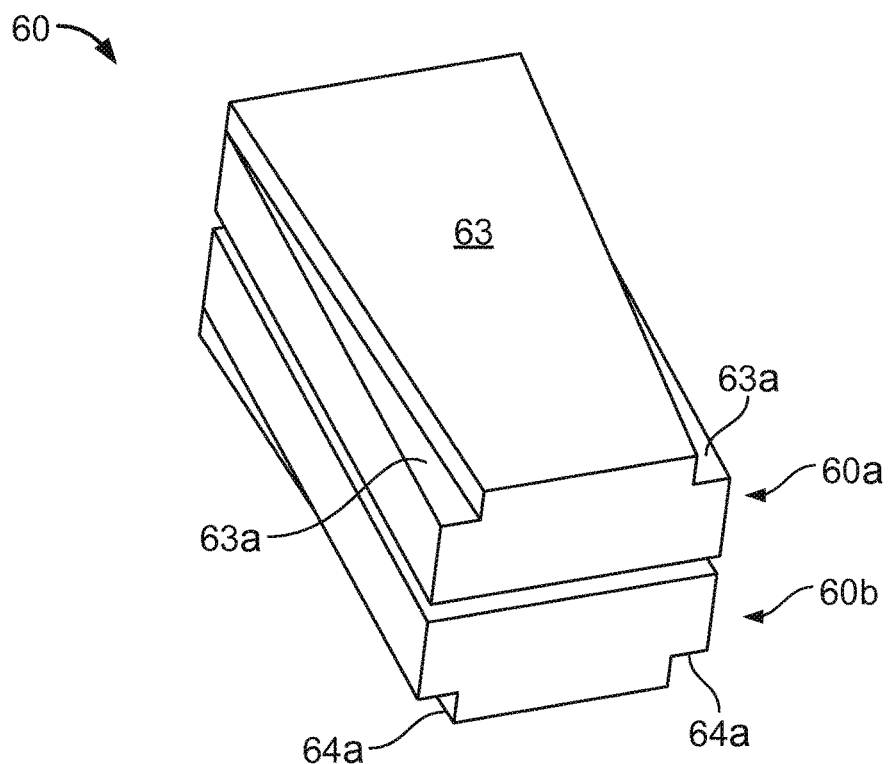
FIG. 12C is a perspective view of another variant of the magnet, wherein the magnet is made up of two pieces stacked one on top of the other, each having pie-shaped steps.

In the embodiment illustrated in FIG. 12A, the magnet 60 has two pie-shaped steps 63a formed adjacent the top pole face 63 on both sides thereof so that the top pole face 63 is narrower at the inner end 61 than at the outer end 62. The embodiment illustrated in FIG. 12B is different from that of FIG. 12A in that the magnet 60 further has two pie-shaped steps 64a formed in the bottom pole face 64 on both sides thereof so that the bottom pole face 64 is also narrower at the inner end 61 than at the outer end 62. The embodiment illustrated in FIG. 12C is different from that of FIG. 12B in that the magnet 60 is made up of two halves 60a and 60b stacked one on top of the other. The two haves 60a and 60b attract each other and help hold each other in place in the rotor 50. In the embodiment illustrated in FIG. 12D, there are four angled peripheral edges 63b adjacent the top pole face 63 and there are four angled peripheral edges 64b adjacent the bottom pole face 64. The top pole face 63 and the bottom pole face 64 are narrower at the inner end 61 than at the outer end 62.

The purpose of the above configurations is to focus the lines of magnetic force or the magnetic flux. The magnet 60 is a good flux conductor. The wide portion of the magnet 60 disposed between the two pole faces 63 and 64 creates more lines of force. The narrow magnet or magnet material on the top surface and/or bottom surfaces 63 and 64, at the poles, causes the lines of force to constrict and focus to a higher concentration at the narrower pole surface(s).

The stepped configuration as illustrated in FIG. 12A reduces the area of the top surface 63 or pole face than other portion of the magnet 60. Accordingly, this configuration helps concentrate the magnetic fields and increase the field strength at the narrowed top surface 63 functioning as a pole end. Therefore, the configuration of FIG. 12A is preferable when the magnet 60 is embodied in an end rotor disposed at the outermost end, with a stator on one side only.

Figure 12D:
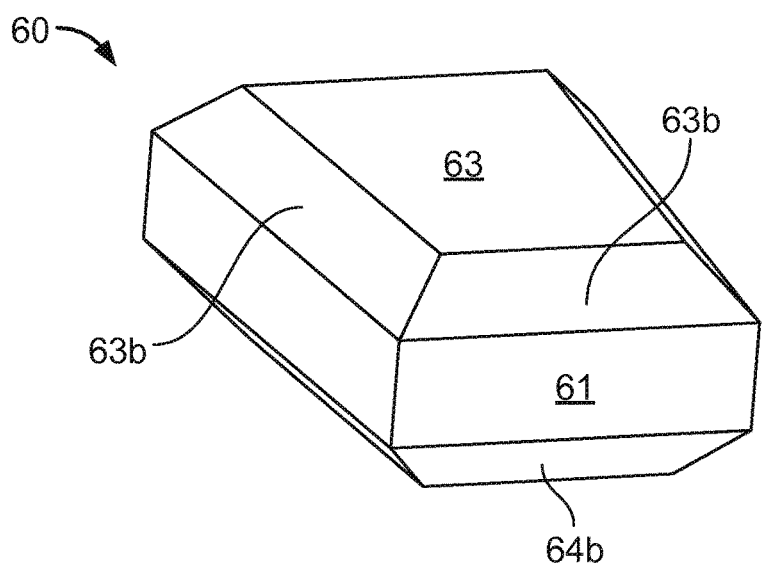
FIG. 12D is a perspective view of another variant of the magnet with angled surface.

The stepped configuration as illustrated in FIGS. 12B and 12C or the angled configuration as illustrated in FIG. 12D reduces both the areas of the top pole face 63 and the bottom pole face 64 than other portion of the magnet 60. Accordingly, this configuration helps concentrate the magnetic fields and increase the field strength at the narrowed bottom surface 64 as well as at the narrowed top surface 63, both functioning as pole ends. Therefore, the configurations of FIG. 12B through 12D are preferable when the magnet 60 is embodied in a middle rotor interposed between stators.

Essentially, the optimal magnet shape is the pole area being narrower than the middle portion. In any of the embodiments, the magnet 60 need not be solid a magnet. The magnet 60 can be built from any number of smaller or thinner magnet pieces stacked so as to make the composite final shape. The stepped or angled configuration can be obtained by machining the magnet 60 or by casting. The casting process is preferred.

The magnets 60 may be of any shape, but preferably have two parallel, flat surfaces (pole faces) that face the stator 20. The polarities of the magnets 60 are preferably north-south-north-south in alternating configurations. This translates to a preferred design using always an even number of magnets 60. The preferred spacing is to use the width of the closest point between magnets 60 as equal to the width of the widest part of the magnets 60, though closer and farther configurations also work with varying efficiencies. Convenient magnet shapes include cylinders or discs, prismatic squares or rectangles, and prismatic pie-shapes truncated with inner and outer arcs.

Figure 13:
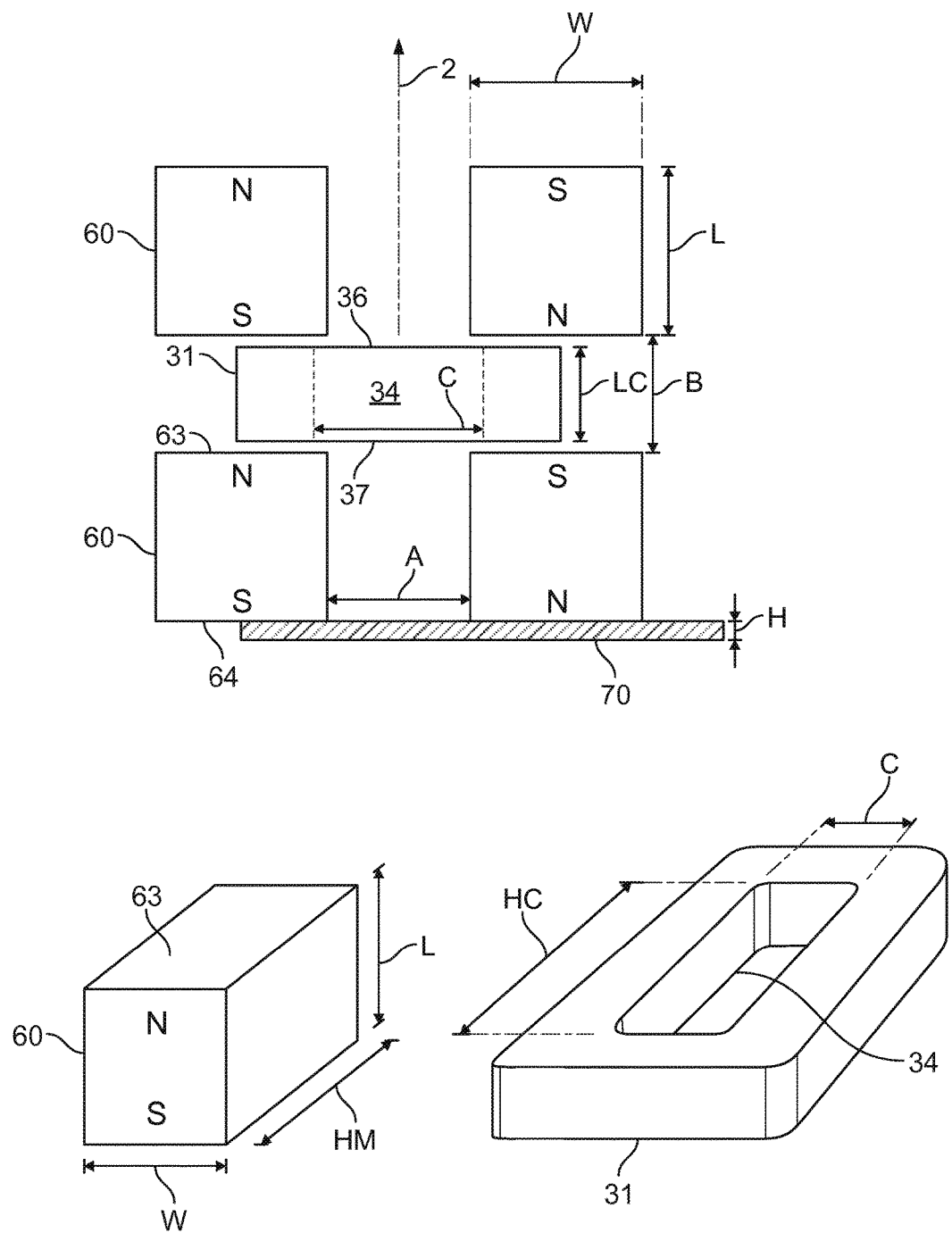
FIG. 13 shows preferred design rules for optimal performance according to the present invention.

FIG. 13 best shows preferred design rules for optimal performance. The magnet 60 has a width W, a length L, and a height HM. The length L is a dimension of the magnet 60 measured between the pole faces 63 and 64. The core 34 has a width C, a length LC, and a height HC. The length B is a dimension of the core 34 measured between the pole faces 36 and 37. A magnet interval as measured between adjacent magnets 60 arranged in the same rotor 50 is denoted as A. A magnet gap between magnets 60 arranged in adjacent rotors 50 as measured along the direction of the axis 2 is denoted as B. The shunt plate has a thickness H.

The design rules according to the present invention is as follow:

W≤A, optimally W=A

L≥A, optimally L>A

B≤A

C≥W, optimally C=W

L>B

HM≥HC

In addition, LC is preferably as close to B as possible so that a gap between the coil 31 and the magnet 60 measured along the direction of the axis 2 can be as small as possible. H should be large enough to transfer substantial flux from coil to coil. Any violation of above rules results in loss of efficiency, but not necessarily non-functionality.

As best shown in FIG. 13, magnets 60 are oriented opposite to each other (north facing south and south facing north) along an axial parallel. Magnets 60 on one rotor 50 are aligned with magnets 60 on the next rotor 50 in this fashion. On a single rotor 50 around the circle that includes the center of each magnet 60 magnets 60 are arrayed opposite to each other, as also seen FIG. 14.

In the preferred embodiments, magnets 60 are oriented with the polarized surfaces (pole faces) aligned normal to the rotor axis. In one alternate embodiment, the magnets 60 can be aligned along a radial. This alternative embodiment may require a second concentric array of coils 31, the first coil array centers aligned with the outer ends of the magnets 60 and the second coil array centers aligned with the inner ends of the magnets 60.

In another alternative embodiment, the magnets 60 can be oriented along the direction of the circle described by the centers of the magnets 60, facing north to north or north to south repetitively around the circle.

In other embodiments, magnets 60 can be oriented facing each other (north facing north and south facing south). In these embodiments, the coil design has to be altered for optimal performance to reverse the winding direction at the center of the coil axis as shown in FIG. 6.

Figure 14:
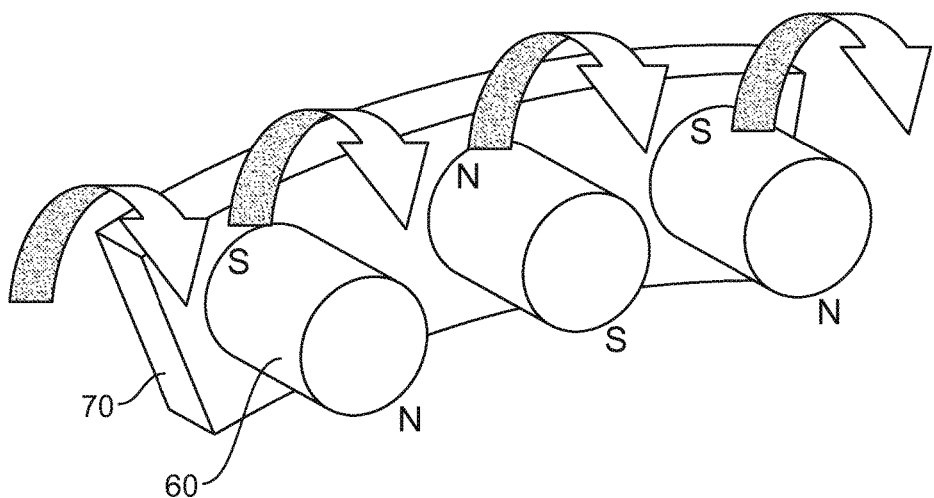
FIG. 14 shows a shunt plate for an electric motor according to the present invention.

In FIG. 14 is shown a shunt plate 70. The shunt plate is used to provide a flux conduction path from one magnet 60 to the next magnet 60. Half of the flux is conducted to the right of each magnet 60 and half to the left of each magnet 60 in FIG. 14. The shunt plate 70 is used on each end of the stator/rotor stack. Additional shunt plates 70 can be used every so many stator/rotor groups as needed. The shunt plate 70 can be made of one contiguous piece of material or of separate pieces of material as needed, although a single contiguous piece is preferred.

The above explanation can be extrapolated to radially-oriented embodiments.

Figure 15:
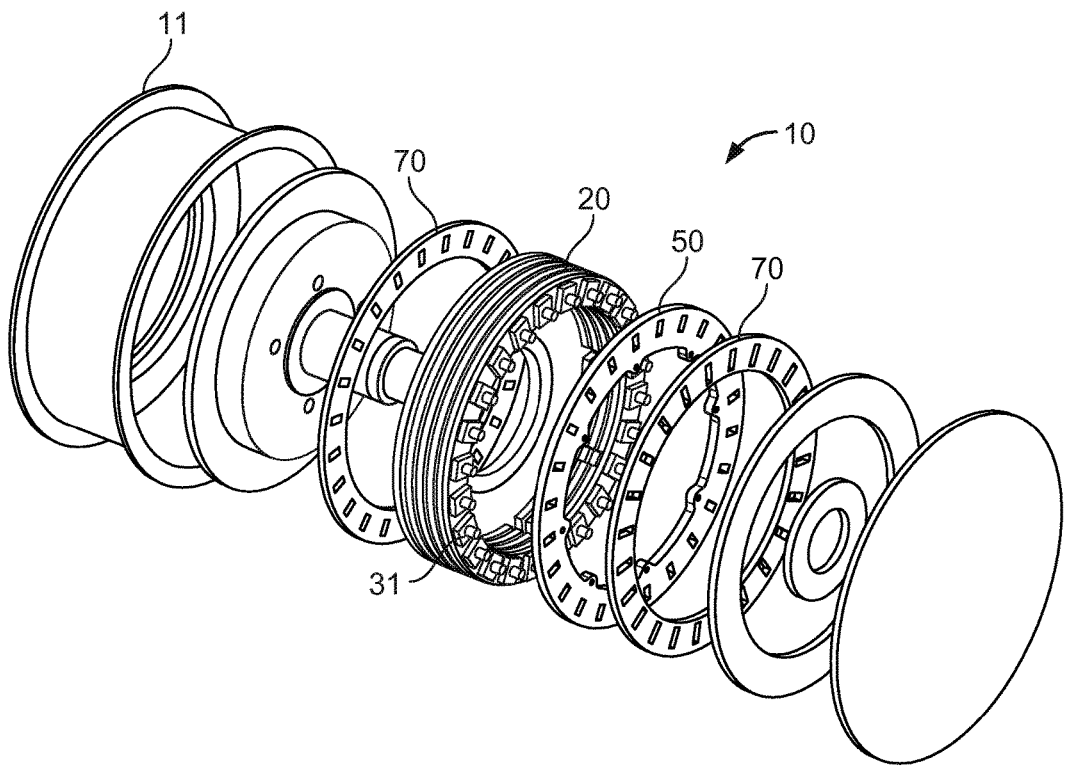
FIG. 15 shows an example of a wheel-and-rim-type hub motor according to the present invention.

FIG. 15 shows an example of the motor 10 according to the present invention, which is embodied a wheel-and-rim-type hub motor. The motor 10 contains a rim 11, two shunt plates on either end of the stator/rotor stack, a number of stators and rotors, each with rectangular coils 31 and magnets 60 in radial arrays, bearings, shafts, and other support components as necessary. This particular design illustrated in FIG. 15 is not modular, except in the sense that each part of the stator/rotor stack can be viewed as a module, however, the design can be implemented with modular components as with all of the high density designs shown.

As shown in FIGS. 2, 14 and 15, at each end of the stator-rotor stack, there is a magnetic shunt path or shunt plate 70. The shunt plate 70 is composed on a material that is able to conduct the magnetic flux. The flux from the rotor magnets 60 is able to close the magnetic flux loop through the shunt plate 70, allowing the flux loop to pass from a south pole to the next north pole to the next south pole, etc as best seen in FIG. 14. The motor 10 can be constructed without one or both shunt plates 70, but performance is negatively affected without the presence of shunt paths 70. The primary design constraint for optimal shunt plate performance is a cross-sectional area equal to half the cross-sectional area of one of the magnets 60.

In some embodiments, the shunt plate 70 can be slotted or made up of discrete segments. Each slot or segment interface is aligned exactly half way between the magnets 60. The slot or interface makes a convenient sharp change of magnet lines of force which can be used with magnetic sensors, such as Hall Effect devices, to tell the motor controllers when to switch the pulses to the coil 31 from +/− to −/+ between the two coil wires. The same signal can be used as the basis of a start point for a timed delay for the switching of the +/− to −/+ between the two coil wires, assuming that a timing delay (or advance) is desired.

Figure 16:
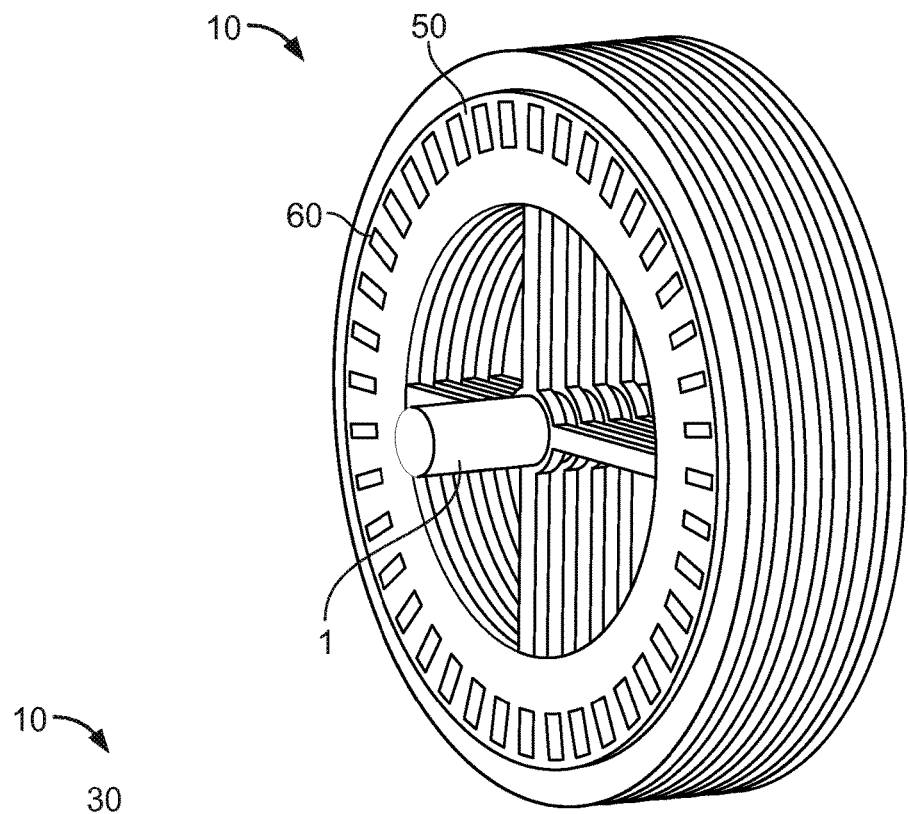
FIG. 16 shows an example of a high density standard configuration motor according to the present invention.

FIG. 16 shows an example of the motor 10 according to the present invention, which is embodied as a high density standard motor. A "standard motor" is defined to be a motor with a stationary stator and rotating rotor or stationary group of stators and rotating group of rotators configured in a stator/rotor stack. The standard motor uses the elements described above: stator(s), rotor(s), coils, permanent magnets, position sensors, coil energizing circuits and/or rectification circuits and design considerations as previously enumerated. In FIG. 16, the rotors 50 contain rectangular magnets 60, and the stators 20 contain rectangular coils 31 and cores 34 (hidden in the stack). The stators 20 are stationary and the rotors 50 turn to drive the central shaft 1.

Figure 17:
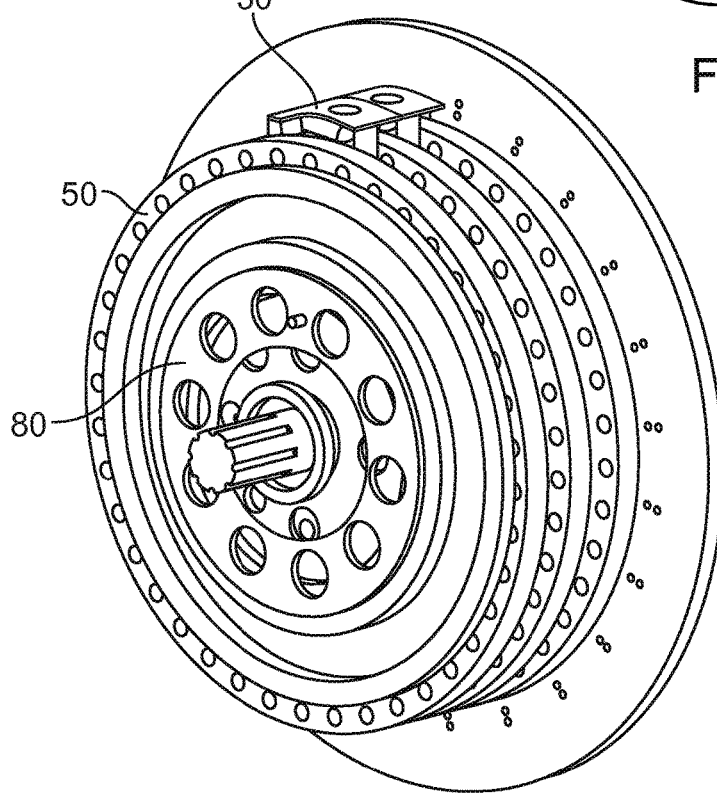
FIG. 17 shows an example of a motor with an epicyclic gear set according to the present invention.
Figure 18:
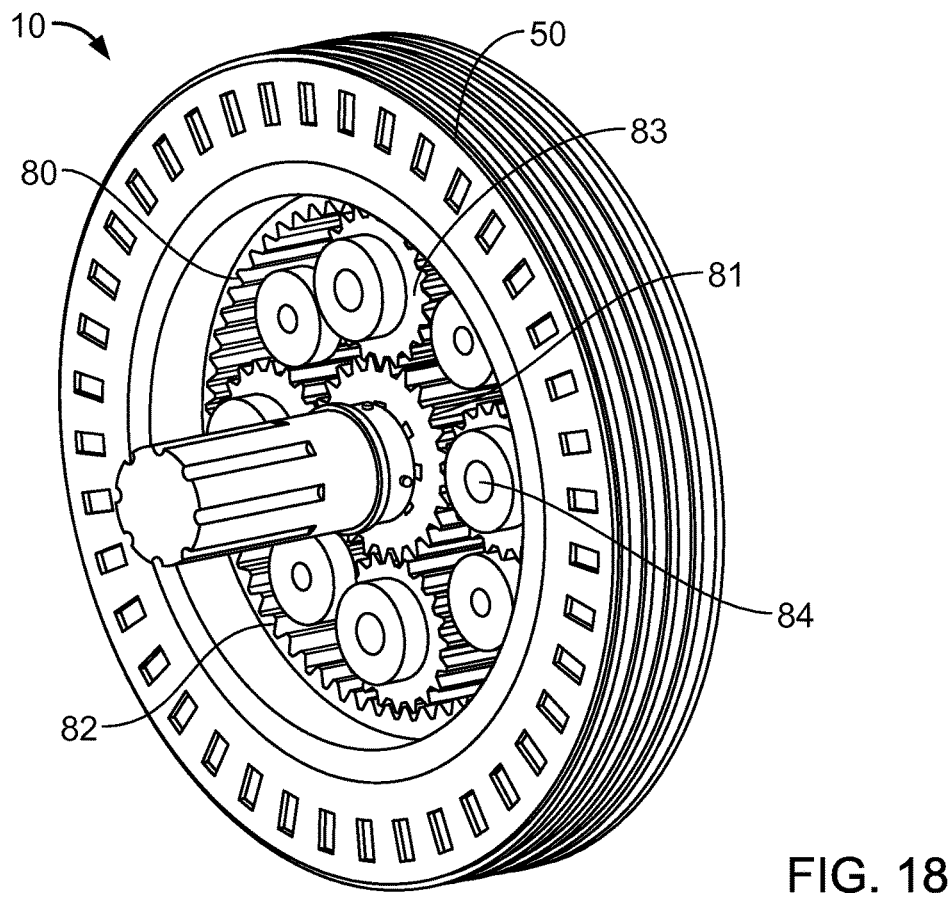
FIG. 18 shows an example of a high density transmission motor according to the present invention.

FIGS. 17 and 18 show examples of the motor 10 according to the present invention, which is embodied with an epicyclic gear set 80. The configuration of the epicyclic gear set 80 is better seen in FIG. 18. The rotors 50 can be set concentrically outside of the ring gear 82 or side-by-side with the ring gear 82. The method of attachment can vary and the rotor can be indirectly or directly attached to the ring gear 82, either next to or outside of the ring gear 82.

In the epicyclic gear set 80, an input shaft of the motor 10 drives a sun gear 81, a ring gear 82 is driven by motor rotors 50, and the planet gear carrier 84 drives an output shaft. The motor 10 optionally uses a clutch or other locking device to limit or lock the motion of the ring gear 82 (or attached rotor 50) relative to the motor housing (not shown). The rotor 50 is driven by energy input from the stator 20 such that the speed of the ring gear 82 can be controlled relative to or different than the speed of the input shaft, resulting in an ability to alter the gearing ratio relative to the output shaft. This gear ratio, based on energy added to the ring gear 82 from the driven rotor 50, results in a variable input to output shaft speed infinitely variable ratio from 1:1 to the ratio of the epicyclic gear set 80. Unlike a regular mechanical transmission, the electric variable transmission adds torque through one or more stator/rotor sections.

In FIG. 17, three rotors 50 drive two stators 20 around the central epicyclic gear set 80. The two stators 20 would contain 24 encapsulated coil modules 30 each, however, only one encapsulated coil module 30 per stator is shown.

In FIG. 18, the same epicyclic gear set 80 as used in FIG. 17 is used. The key difference between the two embodiments shown in FIGS. 17 and 18 is the width of the stator and rotor sections. The width of the stator and rotor sections of FIG. 17 is thicker than the width of the stator and rotor sections of FIG. 18. For example, in FIG. 17 each rotor 50 can be 1.5 inches thick and each stator/rotor section is 3 inches thick, including the 1.5 inch thick rotor 50 while in FIG. 18 each stator/rotor section can be 0.76 inches thick. However, other thicknesses larger or smaller may be used, depending on the desired performance.

Figure 19:
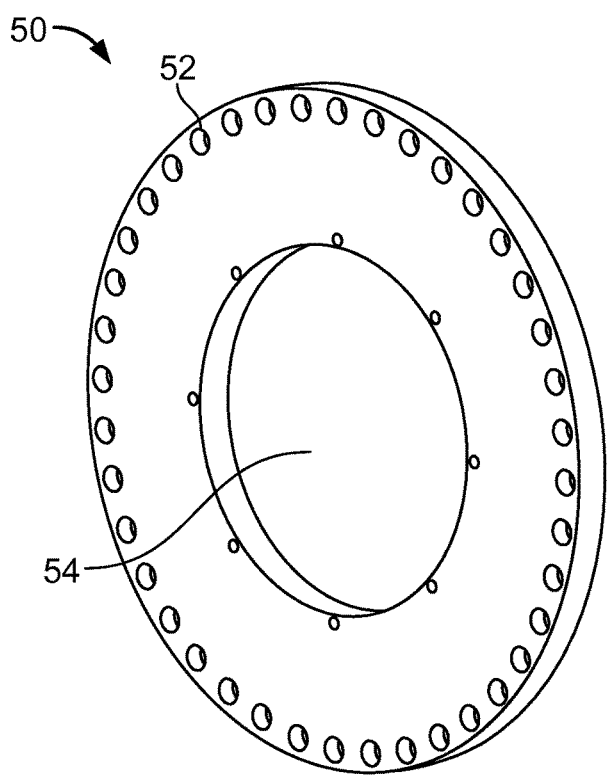
FIG. 19 shows an example of a standard motor rotor according to the present invention.

FIG. 19 shows an example of the rotor 50 of the motor 10 according to the present invention, which is embodied as a standard motor rotor. In this embodiment, the rotor 50 has 40 magnet holes 52 evenly spaced near the outer periphery of the rotor 50. In this case, the rotor 50 is shown with a center hole 54 in the center of the rotor 50 as might be used in a transmission application. In a non-transmission standard motor application the center hole 54 could be much smaller than shown, as necessary to attach to either a shaft, a shaft collar, or other shaft attachment system. The rotor 50 can be designed with any even number of magnet holes 52, each of which should be of a similar shape in a radial array. The magnets 60 can be round, square, pie shaped, rectangular, or any other convenient shape, however, the truncated pie shape as best seen in FIG. 2 is preferred.

Figure 20:
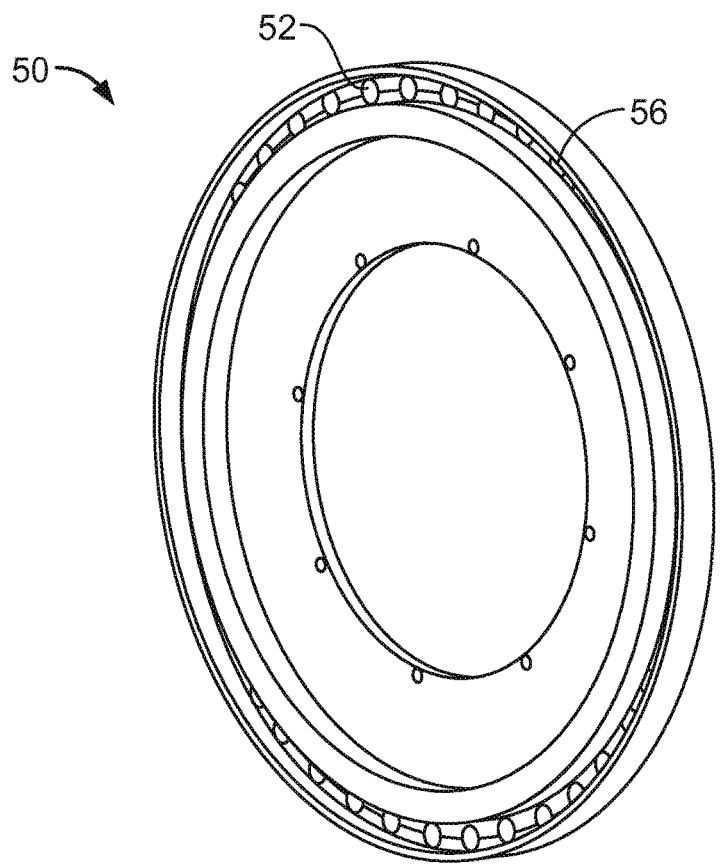
FIG. 20 shows another example of a standard motor rotor according to the present invention.

FIG. 20 shows another example of the rotor 50 of the motor 10 according to the present invention, which is embodied as a standard motor rotor. In this embodiment, the rotor 50 has a circular pocket 56 for receiving the shunt plate 70 (not shown in FIG. 20), which increases motor efficiency by providing a magnetic flux conduction path for each magnet 60 to conduct half of its flux to the next magnet 60 in the radial array on either side. The rotor 50 on each end of the stator/rotor stack is preferably configured with the circular pocket 56 for the shunt plate 70, which should be designed with a magnetically conductive material.

Figure 21:
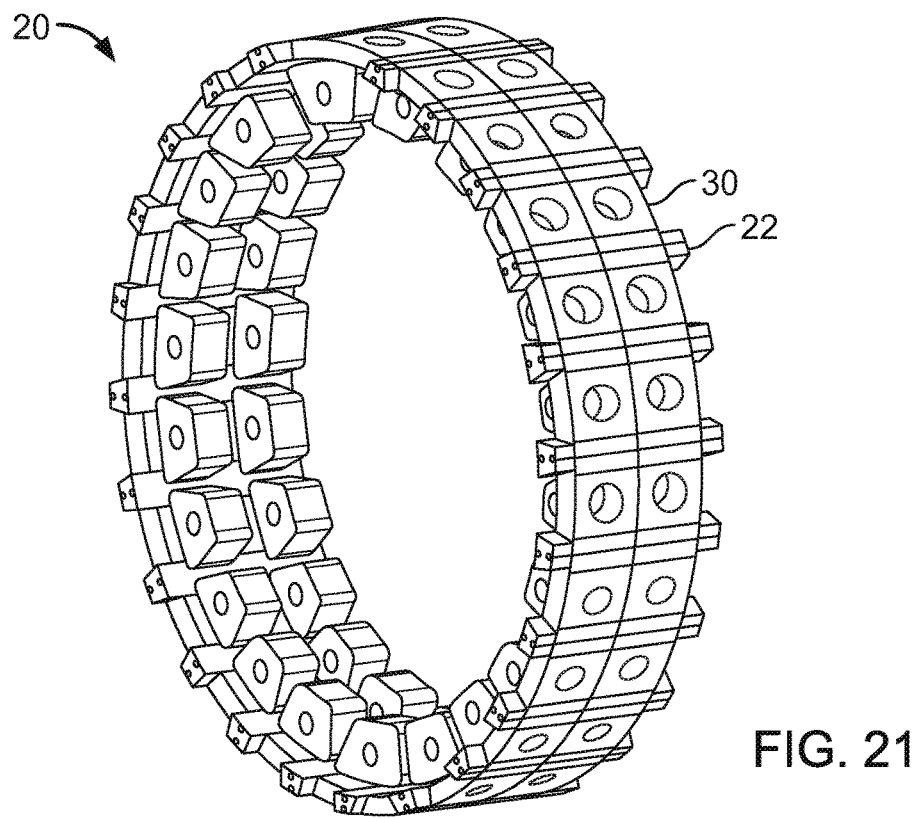
FIG. 21 shows an example of a stator of a motor according to the present invention.
Figure 22:
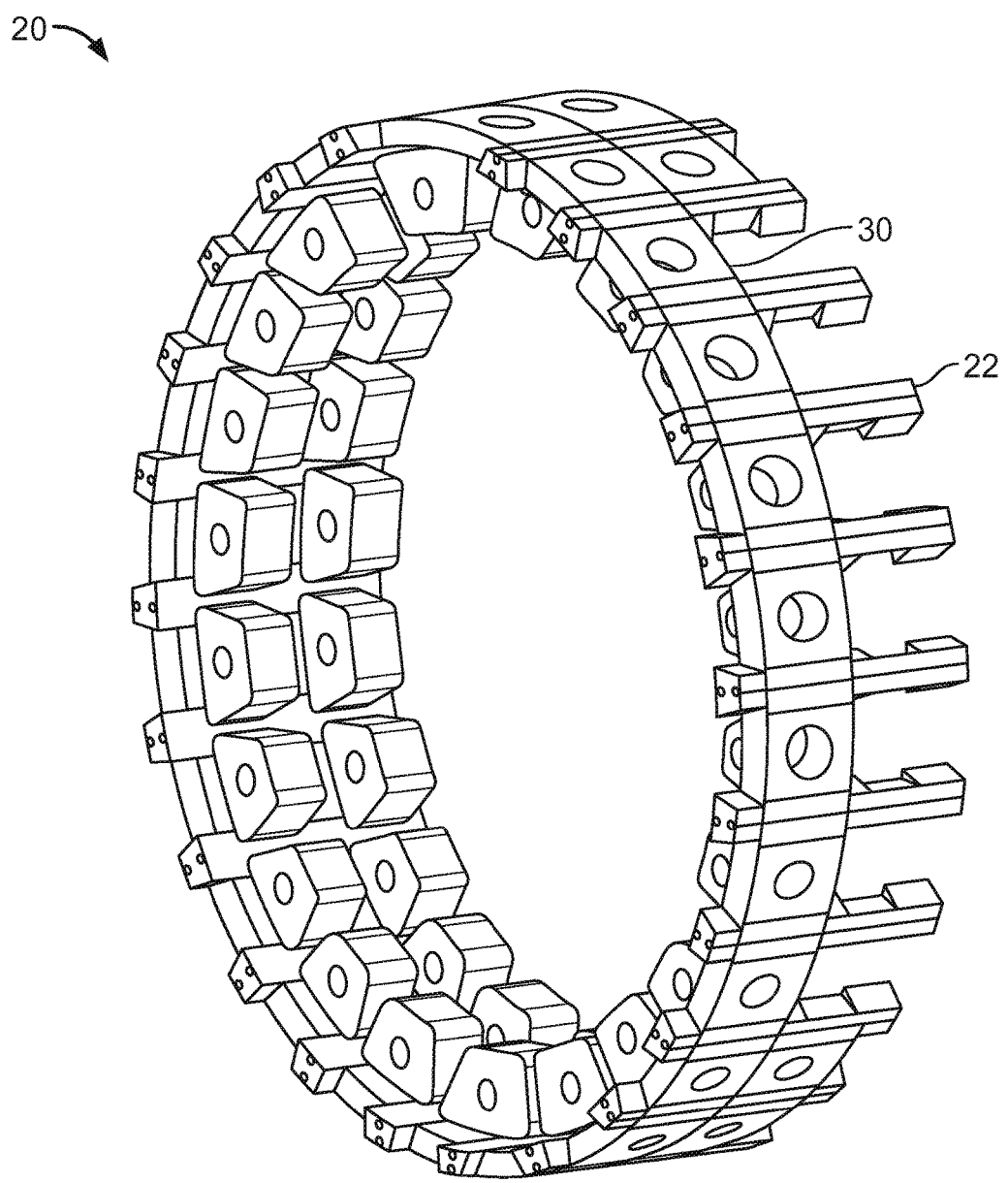
FIG. 22 shows the stator of FIG. 21, with some coil modules omitted for the illustration purpose.

FIGS. 21 and 22 show an example of the stator 20 of the motor 10 according to the present invention. In FIG. 21, there are two stators 20, each composed of a radial array of encapsulated coil modules 30 and support arms 22 as might be used in a modular design. Each radial array of encapsulated coil modules 30 represents a stator section. In FIG. 22, some of the encapsulated coil modules 30 in one of the two stators 20 are omitted for the illustration purpose.

Figure 23:
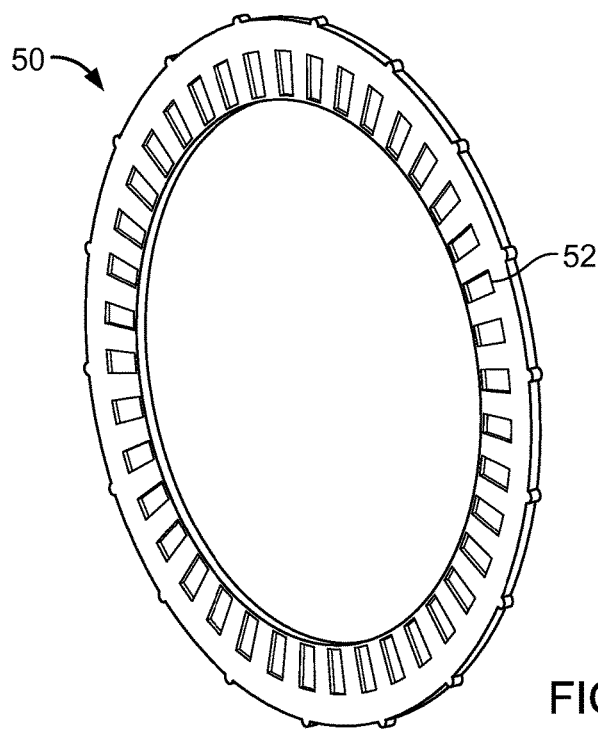
FIG. 23 shows another example of a rotor of a hub motor according to the present invention.

FIG. 23 shows another example of the rotor 50 of the motor 10 according to the present invention, which is embodied as a hub motor. In this embodiment, the rotor 50 of the hub motor 10 is shown such as would be used in an automotive type application.

Figure 24:
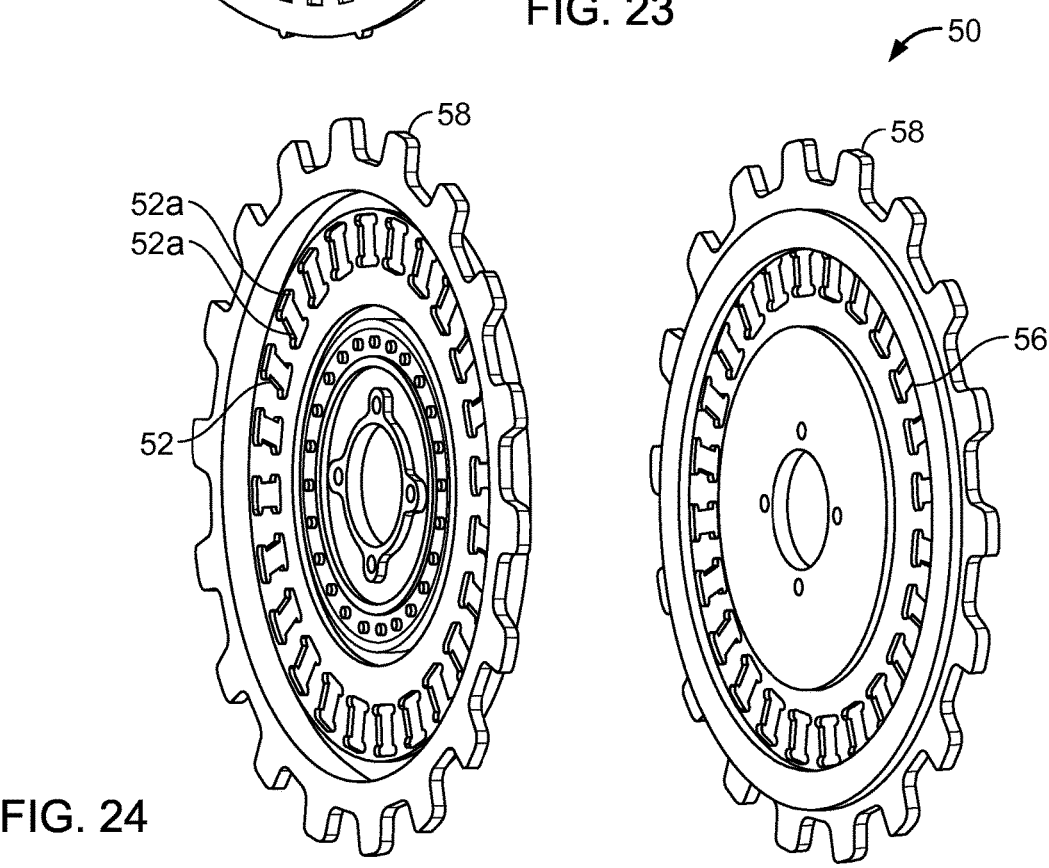
FIG. 24 shows another example of a rotor of a hub motor according to the present invention.

FIG. 24 shows another example of the rotor 50 of the motor 10 according to the present invention, which is also embodied as a hub motor. In this embodiment, the rotor 50 of the hub motor 10 is shown as a sprocket rotor with teeth 58. In the view on the left, the rotor 50 shows magnet holes 52 for rectangular magnets 60 (not shown). The extra half circles 52a in the four corners of each magnet hole 52 are used for convenience in a particular manufacturing process, but these half circles 52a are not necessary for the design to be functional. In the view on the right, the rotor 50 shows a shunt pocket 56 for the shunt plate 70 (not shown).

Figure 25:
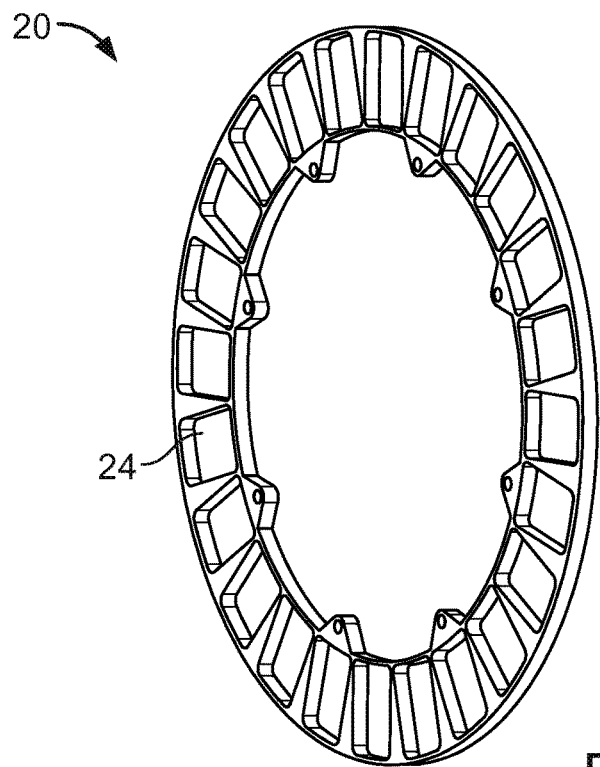
FIG. 25 shows another example of a stator of a hub motor according to the present invention.

FIG. 25 shows another example of the stator 20 of the motor 10 according to the present invention, which is embodied as a hub motor. In FIG. 25, internal rectangular holes 24 for receiving coil modules 30 (not shown) are shown for illustration.

Figure 26:
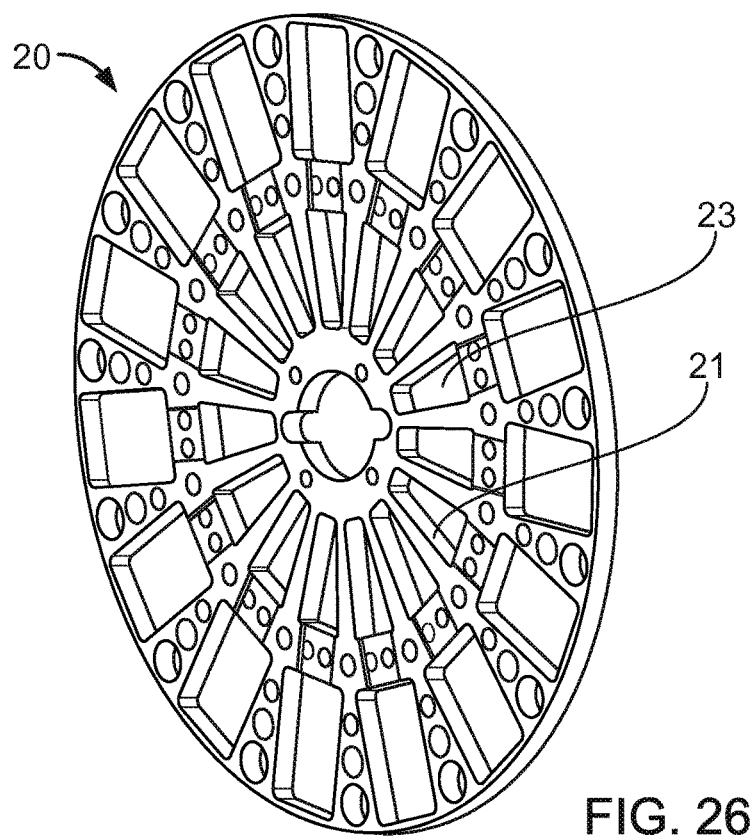
FIG. 26 shows another example of a stator of a motor according to the present invention, with spokes.

FIG. 26 shows another example of the stator 20 of the motor 10 according to the present invention. In this embodiment, the stator 20 has spokes 21. The extra holes 23 are to reduce weight.

In a motor embodiment, a circuit that controls the timing of the pulses switches (or fires) the pulses at the right orientation of the coil 31 relative to the magnet 60 for optimal motor performance. The timing of the switching may be controlled in a variety of ways, including but not limited to brushes, sensing of the magnet position through one or more coils, the use of a Hall effect device, or optical sensors.

As timing is advanced too far, the coil 31 may push or pull the magnets 60 with a net force opposite to the desired direction of motion of the motor 10. This reduces performance and wastes power. The same is true is the timing is retarded too far.

Generator embodiments that rely only on rectification do not need to sense relative magnet/coil relative orientation. Coil/coil based induction generators need to sense this relative orientation.

The regenerative motor according to the present invention can be designed with a variety of phases. Each phase can utilize independent timing of electrical pulses. Typically, a series of coils are located such that the first coil 31 fires, then the second, then the third, etc. until 3 coils 31 have fired in a 3-phase motor or 4 coils 31 have fired in a 4-phase motor, etc. Once the number of coils 31 matching the number of phases of the motor 10 has been reached, the next coils 31 in the series are fired at the same time as the individual coils 31 correspond to the first coils 31 in the repeating series. For example, in a 3-phase motor with 9 coils, coils 1, 4, 7 fire first, the coils 2, 5, 8 fire, and finally coils 3, 6, 9 fire, after which the process repeats.

The number of phases is determined in the design process by determining or selecting the number of magnets 60 and coils 31. The angles between the magnets 60 and coils 31 are used determine the number of phases. Charts or tables can be developed to simplify the process, such as the chart shown in FIG. 27. FIG. 27 shows a table of the number of phases at a given ratio of magnets 60 to coils 31. This table can be used as a look up table to determine the number of phases that a given motor or generator design will have at a given ratio.

Depending on the type of stator and rotor arrays of magnets relative to coils (or coils relative to coils), each coil 31 interacts with 4 magnets 60 at a time, two on either side of the coil as can be seen FIG. 13 (as long as there is an opposing rotor 50 on each side of the coil 31—in embodiments where a coil 31 does not have a rotor 50 on both sides the coil 31 interacts with half the number of magnets 60 at a time). In embodiments with concentric arrays of magnets 60 and coils 31 or side-by-side linear arrays of the same, an individual coil can interact with a greater number of magnets 60.

The present invention can be embodied in various types of motors as further explained below.

Embodiment 1: Standard Regenerative Motor

As seen in FIG. 1 for example, a standard motor is a motor with a stationary stator and rotating rotor or stationary group of stators and rotating group of groups configured in a stator-rotor stack. The standard motor uses the elements described above: stator(s), rotor(s), coils, permanent magnets, position sensors, coil energizing circuits and/or rectification circuits and design considerations as previous enumerated.

Embodiment 2: Standard Layout for Regenerative Motor Modified to Include Epicyclic Gear Set for Infinitely Variable Electric Transmission As seen in FIGS. 17 and 18 for example, a regenerative motor can be modified to include an epicyclic gear set with the input shaft of the motor driving the sun gear, the ring gear driven by motor rotors, and the planet gear carrier driving the output shaft. The motor optionally uses a clutch or other locking device to limit or lock the motion of the ring gear (or attached rotor) relative to the motor housing. The rotors can be set concentrically outside of the ring gear or side-by-side with the ring gear. The method of attachment can vary and the rotor can be indirectly or directly attached to the ring gear, either next to or outside of the ring gear.

The variable electrical transmission uses the elements described above: stator(s), rotor(s), coils, permanent magnets, position sensors, coil energizing circuits and/or rectification circuits and design considerations as previous enumerated.

Embodiment 3: Self-Contained Regenerative Hub Motor

The preferred embodiments are intended for automotive or powersports applications. The hub motor is attached to the bolt studs that typically protrude through the brake rotor. The hub motor can rotate relative to the spindle, faster or slower, as needed. The torque from the motor is generated as one or more rotors which contain an array of alternating north-south magnets are subjected to alternating push-pull forces generated in a stator composed of multiple flat coils.

In this embodiment, these elements are combined for the purpose of capturing energy in a regenerative or generator-based fashion from either a braking action or intentional generative action from higher relative spindle speeds to motor speeds and storing the captured energy in an internal storage device, which energy can subsequently be used to supplement or replace energy from the spindle for rapid and more efficient acceleration or cruising (within the limitations of the energy storage device).

In the self-contained embodiment, the motor controller electronics and some minimal energy storage are contained inside the motor. Control signals can either be transferred by remote control or through the spindle.

In alternate embodiments, the motor can accept power and control signals through the spindle or through slip rings or discs or use a remote control device for communicating drive signals.

Optionally as needed for a specific application, the hub motor has one or more locking devices which can prevent or limit the relative rotation of the hub motor which respect to the spindle. The locking device would take the form of an overriding slip clutch, a multiple disc clutch, or a solenoid/detent mechanism.

The ability of the hub motor to turn at speeds relative to the input spindle or shaft allows the driven wheel to turn at relative speeds to the motor input shaft, allowing the hub motor to add power to the input shaft or take power from the input shaft. This allows the motor to act in a drive mode, a regeneration charging mode, or as in a controlled slip mode.

Embodiment 4: Hub Motor with Stationary Spindle

Embodiment 4 is the same as Embodiment 3 except that in this embodiment the spindle or shaft is stationary. The hub motor rotor turns around the stationary shaft. This embodiment allows power and control signal wires to be passed through the spindle (including a hollow spindle, a solid spindle with multiple insulated electrical pathways, or a slot in the spindle). In this embodiment, the motor control electronics and/or power source can be located inside of the hub motor or outside of the hub motor.

Embodiment 5: Hub Motor with Internal Epicyclic Gear System

In this embodiment, the center area of the hub motor contains an epicycle gear system. The input spindle of the motor connects to the sun gear of the gear system. The motor rotors connect to the ring gear of the gear system. The planetary gear carrier connects to the rotating housing of the hub motor, which in turn drives the tire, roller, sprocket, outer gear teeth, etc.

Optionally, for some applications it may be appropriate to include a locking mechanism to lock the gear system so that the input shaft directly turns the wheel, sprocket, etc. The locking system may be composed of an overriding slip clutch, a disc clutch, a solenoid/detent mechanism, etc.

The presence of the epicyclic gear system allows the driven wheel to turn at relative speeds to the motor input shaft, allowing the hub motor to add power to the input shaft or take power from the input shaft. This allows the motor to act in a drive mode, a regeneration charging mode, or as in a controlled slip mode. As opposed to the first embodiment which does not have a gear system, the presence of the gear system in this embodiment allows a definite torque increase from the input shaft to the driven wheel, which may be especially useful in uphill or starting from rest situations.

Embodiment 6: Linear Motor

A linear motor embodiment contains the following elements: 1) a linear rotor containing a one or more linear arrays of magnets or coils, 2) a linear stator containing one or more linear arrays of coils, 3) a method of sensing coil relative to magnet position as described previously for driven coils (left out in a linear generator embodiment), 4) a method of constraining or limiting the path of motion, which may include some form of linear bearing or bushing arrangement that allows the rotor and stator to move relative to each other in a predefined path, 5) optionally a travel limiting system (springs, hard stops, elastomeric bumpers, magnets, dampers, or combinations of these items), and 6) optionally a clutching or braking system.

Embodiment 6a: Linear Positioning Motor

A linear positioning motor embodiment is obtained when a linear motor as described in Embodiment 6 is combined with an absolute or incremental position encoder of any type (optical, magnetic, etc.) and a closed-loop feedback system. The linear positioning motor does not experience magnetic pull from rotor to stator when the coils are not energized. This means that the motor does not have a tendency to snap into a position other than the last relative position of the stator(s) and rotor(s) where the motor last came to a rest (unless there are external forces). As such, if the closed loop feedback system detects any start of motion from the last rest position, it can energize the coils to reposition and hold the motor at the original position.

Embodiment 7: Pancake Motor

A pancake motor is defined to be a thin motor (or generator) where the motor diameter is larger than the motor thickness. A pancake motor embodiment of the Regenerative Motor and Coil Design is identical to the standard motor design with the limitation of the diameter to width envelope dimensional proportions. The Regenerative Motor and Coil Design is particularly suited to pancake motor applications due to the thin stator/rotor sections upon which the invention is based.

Embodiment 8: Rotary Positioning Motor

A rotary positioning motor embodiment is obtained any time any of the rotary motor embodiments described herein are utilized with an absolute or incremental positioning sensor of any type (optical, magnetic, etc.) and combined with a closed-loop feedback system. The rotary positioning motor does not experience magnetic pull from rotor to stator when the coils are not energized. This means that the motor does not have a tendency to snap into a position other than the last relative position of the stator(s) and rotor(s) where the motor last came to a rest (unless there are external forces). As such, if the closed loop feedback system detects any start of motion from the last rest position, it can energize the coils to reposition and hold the motor at the original position.

Embodiment 9: Cup Motor

A cup motor embodiment can be designed 1) using the radially aligned magnet/coil or coil/coil stator/rotor elements as described above or 2) stator/rotor sections that use a hollow center section.

Embodiment 10: Magnetic Modules

The coils and cores described herein can exist in a variety of configurations. In one embodiment, the coils are encapsulated within another material whether within one or more thin sheets of material or fully encapsulated in a polymer or other encapsulating material. In the encapsulated embodiment, the encapsulated coil modules can optionally include electrical control system for energizing the coil based on a timing signal or count, or for rectifying generated power, or with both an energizing circuit and a rectifying circuit with circuit path switching as applicable. In some embodiments, best performance is generated if energy is input into the coil for part of a duty cycle and then extracted from the coil during another part of the duty cycle. This is useful if a designer desires to input energy to create the field and then capture energy from the collapsing fields to increase efficiency, similar to the way that a compressed spring stores potential energy which can subsequently released.

Magnetic modules can exist with one or more coils in stand-alone units or as part of a larger assembly. Magnetic modules can be fractions of a stator or the entire stator. Magnetic modules can include coils or coils and electronics to control or derive power from coils.

Embodiment 11: Linear Propulsion Motor (Trains, Etc.)

The principles described in the linear motor can be readily extrapolated to a propulsion system for a variety of track-based electric vehicles. One embodiment uses alternating permanent magnets in a track and coils on a vehicle using the linear push-pull rotor/stator interactions described above. Another embodiment uses permanent magnets on the vehicle and coils in the tracks.

Embodiment 12: Projectile Device

The same concepts for the Linear Propulsion Motor can be further extrapolated to launch vehicles or objects from a track as a projectile. Projectile based embodiments can utilize the coil design described herein in two-dimensional or three-dimensional coil arrays configured around a tube in one or more linear arrays around permanent magnet or induced magnetic projectiles.

Embodiment 13: Solenoid Devices

In a solenoid embodiment of the Regenerative Motor and Coil Design, the coils and magnets (possible one magnet and one coil) are configured to operate as a solenoid. The coil is energized to move the magnet. The coil can be re-energized or de-energized (in the presence of gravity, a spring, compressed gas, or other return motion system) to return the solenoid to the initial position.

In all embodiments described above, optionally, coil energizing or power harvesting circuits can be included within the motors or be included separate from the motors and wired to the coils inside of the motor. It is frequently convenient to include the electronics within the center of a hub motor or integrated into the magnetic modules of a standard motor, transmission motor, or similar.

All of the embodiments described herein can also optionally be configured with the coil energizing circuits, coil energy harvesting circuits, part-time energizing/harvesting circuits, or on-demand energizing/harvesting switching circuits.

In each of the embodiments, the designer can optionally choose to make the design modular or non-modular. In modular embodiments, one or more of the coils can be made as a self-contained module. This modular design facilitates assembly and maintenance such that if a coil module fails, it can be replaced with minimal disassembly of the motor—in some cases without even stopping the motor. It is also conceivable to make entire coil stator section as a module for easy replacement, though it might be advisable to allow the stator to at least be divisible into two sections to minimize disassembly. While rotors can also be divisible into discrete module sections as a contemplated embodiment or alteration to the embodiments, the advantages to doing so are less clear.

The present invention can be further embodied in various types of motors as further explained below.

Alternate Embodiment 1: Radial Flux Paths (Magnet-Coil Flux Path on Radials Rather than Axial Parallels)

This embodiment is similar to the cup motor without the hollow center section.

Alternate Embodiment 2: Multiple Concentric Arrays of Coils and Magnets

In applications where additional power to volume ratios are desired, stators and rotors can be configured as described in embodiments above but with one or more additional concentric arrays of magnets and coils in rotors and stators. Coils and magnets can be radially aligned or staggered from concentric array to concentric array.

Alternate Embodiment 3: Multiple Lines of Coils in Magnets for Linear Motor

This embodiment is similar to the Alternate Embodiment 2 for rotary motors, aligned or staggered linear arrays of magnets and coils can be used in linear rotors and stators for additional performance.

Alternate Embodiment 4: Multiple Concentric Arrays of Coils and Magnets II

This embodiment is similar to Alternate Embodiment 2, except that one or more of the stator/rotor sections can be configured in axial orientations and, within the same device, one or more stator/rotor sections can be configured in the radial orientation, possibly in an alternating configuration.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A regenerative motor comprising:
   a stator having a stator frame and an array of coil modules individually connected to the stator frame and arranged about a central axis of the stator;
   a first rotor having an array of magnets arranged in said rotor,
      wherein each of the magnets has
         a substantially uniform width W defined between opposite sides of the magnet and perpendicular to the central axis, and
         a length L between pole faces of the magnet along the central axis, and
      wherein each of the magnets is distanced from adjacent magnets of the first rotor by a minimum magnet distance A perpendicular to the central axis between facing magnet surfaces along the central axis, and wherein the magnet distance is no less than the width of the magnet (A>=W), and the length of the magnet is no less than the width of the magnet (L>=W);
   a second rotor adjacent to the first rotor and having an array of magnets arranged in said second rotor, wherein the magnets of the first rotor are distanced from adjacent ones of the magnets of the second rotor by a magnet gap B along the central axis, and wherein the length of the magnet is no less than the magnet gap (L>=B); and
   a control system configured to input electrical energy into the coil modules in a cyclical fashion and to regulate the coil modules separately;
   wherein at least one coil module comprises:
      a coil module bracket positioned at a radial location along an outer circumference of the stator and removably attached to the stator frame;
      a first conductive winding projecting radially inward, from the coil module bracket toward the central axis, into a gap defined between the first rotor and the second rotor; and
      a second conductive winding projecting radially inward from the coil module bracket toward the central axis into a second gap defined between the second rotor and a third rotor adjacent to the second rotor, the second conductive winding being spaced from the first conductive winding in a linear direction parallel to the central axis of the stator; and
   wherein the at least one coil module is removable radially from the stator frame as a unit from between two other coil modules without removing the two other coil modules.

2. The motor of claim 1, wherein the first and second conductive windings are each wrapped around a respective core extending in a direction perpendicular to the coil module bracket and the central axis, the respective cores of the first and second conductive windings being separated in the linear direction parallel to the central axis of the stator.

3. The motor of claim 2, wherein each core comprises a substantially ironless core.

4. The motor of claim 2, wherein each core comprises an air core.

5. The motor of claim 2, wherein each core has a shape generally matching a cross-sectional shape of said magnet.

6. The motor of claim 2, wherein each core is non-circular.

7. The motor of claim 2, wherein each core comprises a gauge wire.

8. The motor of claim 2, wherein each core comprises thin steel with a slit.

9. The motor of claim 1, wherein said motor comprises a hub motor.

10. The motor of claim 1, further comprising:
    an epicycle gear set comprising a sun gear, a planet gear, a planet gear carrier, and a ring gear;
    wherein said sun gear receives a rotational force from a first input;
    wherein said planet gear encircles said sun gear and meshes with said sun gear and said ring gear;
    wherein said planet gear carrier is connected to said planet gear such that said planet gear transfer a rotational energy to said planet gear carrier; and
    wherein said ring gear comprises said first rotor.

11. The motor of claim 2, wherein a wire is wound continuously from a center side of a first core for the first conductive winding to an outside of the first core to form the first conductive winding and then wound from the center side of a second core for the second conductive winding to the outside of the second core to form the second conductive winding.

12. The motor of claim 11, wherein the first and second conductive windings are oriented opposed to each other.

13. The motor of claim 11, wherein the first and second conductive windings are oriented in a same direction.

14. The motor of claim 2, wherein the first and second conductive windings comprise a flattened wire.

15. The motor of claim 14, wherein the wire is wound such that a larger flat surface of the wire is facing in a direction perpendicular to an axis of the core.

16. The motor of claim 1, further comprising a shunt plate positioned at an end of a stack comprising the stator and the first and second rotors, wherein the shunt plate has a thickness along the central axis large enough to provide a flux conduction path from a first magnet of the magnets to a second, adjacent magnet of the magnets.

17. The motor of claim 1, wherein each coil module is arranged such that its first and second conductive windings are disposed on opposite sides of one of the first and second rotors.

18. The motor of claim 1, wherein both sides of the first conductive winding directly face different rotor surfaces of the first and second rotors, and both sides of the second conductive winding directly face different rotor surfaces of the second and third rotors.

19. The motor of claim 1, wherein the first and second conductive windings are each wound about axes parallel to the central axis.

20. The motor of claim 1, wherein the magnet distance is no less than the magnet gap (A>=B).

21. The motor of claim 2, wherein a width of each core (C) perpendicular to the central axis is no less than the width of the magnet (C>=W),
    wherein a height (HM) of the magnet is no less than a height (HC) of the core (HM>=HC), and
    wherein a length (LC) of the core between pole faces of the core and along the central axis is substantially close to the magnet gap (B), such that a gap between the coil and the magnet parallel to the central axis is substantially small.

22. The motor of claim 16, wherein the shunt plate comprises a plurality of slots or discrete segments each aligned between two adjacent magnets and configured to make a change of magnet lines of force that is used to determine when to switch pulses to the coil module from +/− to −/+ between the first and second conductive windings.

23. The motor of claim 1, wherein the length of the magnet is no less than the magnet distance ($L >= A$).

* * * * *